US012580202B2

(12) United States Patent
Edmundson et al.

(10) Patent No.: US 12,580,202 B2
(45) Date of Patent: Mar. 17, 2026

(54) ELECTRODE LAYER COMPOSITION, PROCESS FOR THE MANUFACTURE THEREOF AND MEMBRANE ELECTRODE ASSEMBLY

(71) Applicants: W. L. Gore & Associates, Inc., Newark, DE (US); W. L. Gore & Associates G.K., Tokyo (JP)

(72) Inventors: Mark D. Edmundson, Rancho Palos Verdes, CA (US); Masashi Maruyama, Tokyo (JP); Atsushi Sakamoto, Tokyo (JP); Masaki Tani, Tokyo (JP)

(73) Assignees: W. L. Gore & Associates, Inc.; W. L. Gore & Associates G.K., Tokyo (JP)

( * ) Notice: Subject to any disclaimer, the term of this patent is extended or adjusted under 35 U.S.C. 154(b) by 83 days.

(21) Appl. No.: 18/422,103

(22) Filed: Jan. 25, 2024

(65) Prior Publication Data

US 2024/0250271 A1 Jul. 25, 2024

Related U.S. Application Data

(60) Provisional application No. 63/481,392, filed on Jan. 25, 2023.

(51) Int. Cl.
| | |
|---|---|
| *H01M 4/88* | (2006.01) |
| *H01M 4/90* | (2006.01) |
| *H01M 4/92* | (2006.01) |

(52) U.S. Cl.
CPC ....... *H01M 4/8825* (2013.01); *H01M 4/9041* (2013.01); *H01M 4/926* (2013.01)

(58) Field of Classification Search
None
See application file for complete search history.

(56) References Cited

U.S. PATENT DOCUMENTS

| | | | | |
|---|---|---|---|---|
| 6,054,230 A * | 4/2000 | Kato | ................... | H01M 4/8839 |
| | | | | 429/480 |
| 2019/0312284 A1* | 10/2019 | Oh | ....................... | H01M 4/8657 |
| 2020/0328444 A1* | 10/2020 | Endo | ................... | H01M 4/8882 |
| 2021/0159510 A1* | 5/2021 | Kim | .................... | H01M 4/8642 |

* cited by examiner

*Primary Examiner* — Michael P. Rodriguez
(74) *Attorney, Agent, or Firm* — Faegre Drinker Biddle & Reath

(57) ABSTRACT

There is provided a process for the manufacture of an electrode layer composition for electrochemical devices, such as for fuel cells. Also provided is an electrode layer composition, such as a composition obtainable by the disclosed process. The electrode layer composition comprises electrode liquid carrier, catalyst and ion exchange material, wherein at least a portion of the ion exchange material is bound to the catalyst and the weight ratio of ion exchange material bound to the catalyst compared to the total amount of ion exchange material in the composition is at least 0.3. A method for the determination of the bound ratio of an electrode layer composition is also disclosed.

24 Claims, 6 Drawing Sheets

Figure 2:
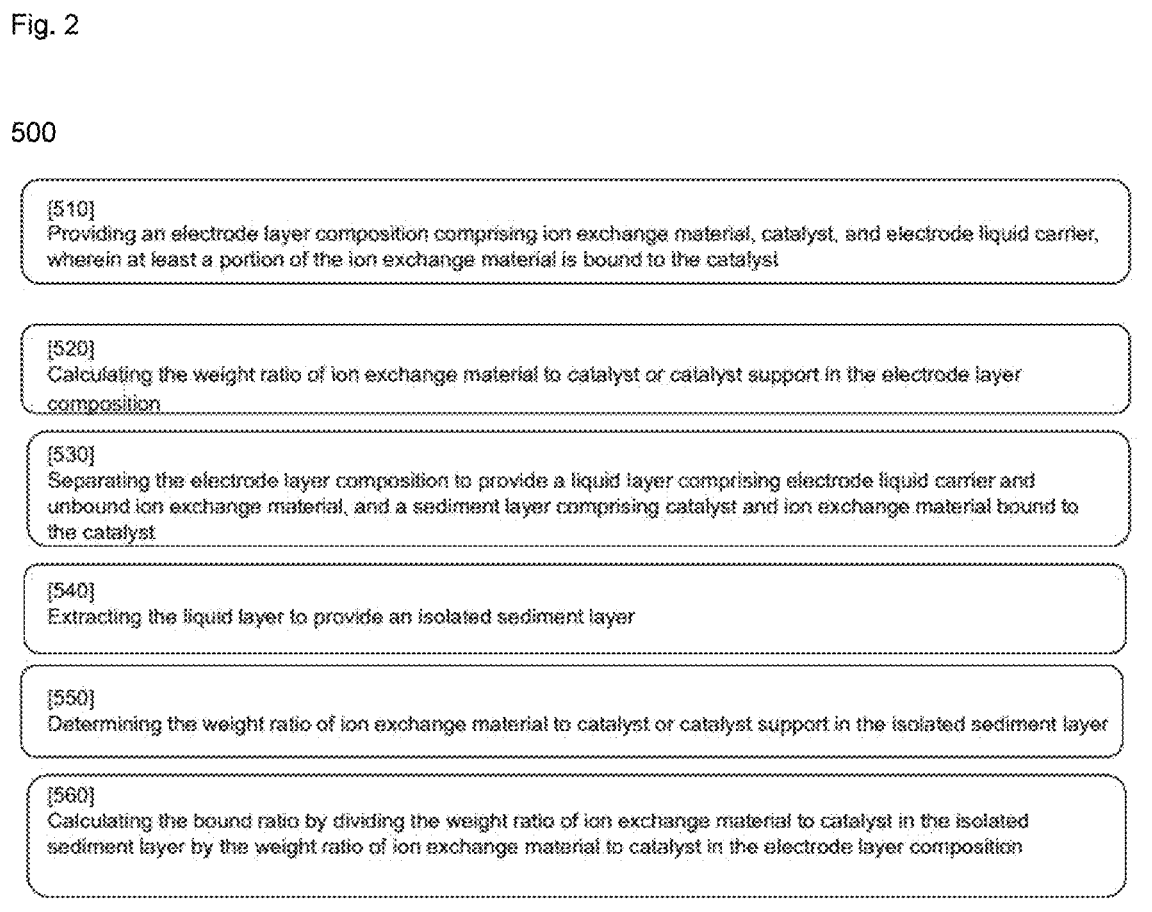

[510]
Providing an electrode layer composition comprising ion exchange material, catalyst, and electrode liquid carrier, wherein at least a portion of the ion exchange material is bound to the catalyst

[520]
Calculating the weight ratio of ion exchange material to catalyst or catalyst support in the electrode layer composition

[530]
Separating the electrode layer composition to provide a liquid layer comprising electrode liquid carrier and unbound ion exchange material, and a sediment layer comprising catalyst and ion exchange material bound to the catalyst

[540]
Extracting the liquid layer to provide an isolated sediment layer

[550]
Determining the weight ratio of ion exchange material to catalyst or catalyst support in the isolated sediment layer

[560]
Calculating the bound ratio by dividing the weight ratio of ion exchange material to catalyst in the isolated sediment layer by the weight ratio of ion exchange material to catalyst in the electrode layer composition

ELECTRODE LAYER COMPOSITION, PROCESS FOR THE MANUFACTURE THEREOF AND MEMBRANE ELECTRODE ASSEMBLY

CROSS-REFERENCE TO RELATED APPLICATION

This application claims the benefit of Provisional Application No. 63/481,392, filed Jan. 25, 2023, which is incorporated herein by reference in its entirety for all purposes.

FIELD OF THE INVENTION

This disclosure relates to a process for the manufacture of an electrode layer composition for electrochemical devices, such as for fuel cells, particularly for polymer electrolyte membrane (PEM) fuel cells. Also provided is an electrode layer composition, such as a composition obtainable or obtained by the disclosed process. The electrode layer composition comprises liquid carrier, catalyst and ion exchange material, wherein at least a portion of the ion exchange material is bound to the catalyst and the weight ratio of ion exchange material bound to the catalyst compared to the total amount of ion exchange material in the composition (i.e., "bound ratio") is at least 0.3. A method for the determination of the bound ratio of an electrode layer composition is also disclosed.

Further disclosed is a process for the manufacture of a membrane electrode assembly (MEA) component and MEA from such an electrode layer composition. Also provided is a membrane electrode assembly component and MEA obtainable or obtained by the disclosed process. The provision of an electrode layer composition with ion exchange material bound to the catalyst provides MEA components and membrane electrode assemblies manufactured by the direct deposition of the electrode layer composition with improved performance, such as increased current density under wet conditions.

BACKGROUND

A Membrane Electrode Assembly (MEA) is a core component of an electrochemical device and is the location where the electrochemical reactions take place. In fuel cells, these electrochemical reactions generate power. A typical MEA comprises an electrolyte, such as a polymer electrolyte membrane (PEM), and two electrodes comprising catalyst (i.e., the anode and the cathode), which are attached to opposite sides of the electrolyte membrane in a multi-layer assembly. Additionally, the MEA may also include gas diffusion layers (GDLs), which are attached to the outer surfaces of each electrode, opposite to those surfaces in contact with the electrolyte. The GDLs are typically comprised of carbon paper. If two GDLs are present with one attached to each electrode, then the final MEA is considered a multi-layer, e.g., five-layer, assembly including a first layer of GDL, an anode (i.e., electrode), an electrolyte membrane (which may contain one or more layers of electrolyte), a cathode (i.e., electrode) and another, second, layer of GDL.

Typically, the electrolyte and GDLs have sufficient mechanical integrity to be self-supporting, but the electrodes do not. Therefore, each electrode is typically formed on a substrate which may be the electrolyte, a GDL, or a releasable support layer. The layers of the MEA are then bonded together with heat and/or pressure as needed to form a multi-layer assembly.

The electrolyte, such as a PEM, separates two reactants, such as reactant gas streams. In a fuel cell, on the anode side of the MEA, a fuel, e.g., hydrogen gas, is oxidized to separate the electrons and protons. The cell is designed so that the electrons travel through an external circuit while the protons migrate through the electrolyte. On the cathode side the electrons and protons react with an oxidizing agent (e.g., oxygen or air) to produce e.g., water and heat. In this manner, an electrochemical potential is maintained and current can be drawn from the fuel cell to perform useful work.

There are various established techniques for forming the electrodes on a polymer electrolyte membrane and/or bonding the electrodes to other layers of the MEA. However, each technique has its own problems. In one known method, the electrodes are coated onto a releasable support layer and then laminated to an electrolyte, such as a PEM. However, this method is inefficient and costly, requiring the initial manufacture of an electrode on a releasable support layer and then the lamination of the electrode on the electrolyte membrane and the removal of the releasable support layer whilst the electrode must be retained on the electrolyte membrane.

More recently, this addition of an electrode to an electrolyte membrane has been streamlined by coating liquid electrodes directly onto the electrolyte membrane, such as a PEM, and drying the composition to form the electrode. However, coating the electrode layer composition directly on the electrolyte membrane can produce an electrode with undesirable properties. The coated liquid electrode layer compositions comprise catalyst, ion exchange material and liquid carrier, such as water and/or alcohol. Upon drying to provide an electrode, the liquid carrier evaporates from the surface of the coated liquid electrode. The evaporation of the liquid carrier can increase the capillary stress of the liquid, which can lead to cracking in the dried electrode. In addition, direct contact of the electrolyte with the liquid carrier of the coated liquid electrode can induce the swelling of the electrolyte, which may also produce cracking of the dried electrode as the electrolyte expands from contact with the liquid carrier and then contracts upon removal of the liquid carrier by evaporation. The cracking of the dry electrode can lead to a reduction in the performance of the electrochemical device containing such an MEA, for instance a fuel cell. Such a performance reduction may include voltage drop (also known as overvoltage) in the mass transport region of the polarization curve of an electrochemical device like a fuel cell, particularly under wet conditions. It may also lead to inhomogeneities in the distribution of current density or mechanical stress that can accelerate performance degradation and shorten the useful life of the MEA.

It will be apparent that an MEA manufactured by the lamination of a dried electrode coated onto a releasable support to an electrolyte does not suffer from such problems because the coated liquid electrode layer composition comprising the liquid carrier is coated onto a releasable support and dried to form the dried electrode before the dried electrode is laminated to an electrolyte. This means that the liquid carrier is not present in any substantial amount when the dried electrode is contacted with the electrolyte.

Therefore, the provision of MEAs by direct coating of the electrode layer composition on the electrolyte may be limited by reduced performance. Accordingly, a need exists for processes for the manufacture of an MEA by direct coating of the electrode layer composition which provides an MEA with improved performance.

SUMMARY

This disclosure addresses the problems mentioned above. In a first aspect there is provided a process for the manufacture of an electrode layer composition fora membrane electrode assembly, said process comprising at least the steps of:

providing a catalyst composition comprising ion exchange material, catalyst and catalyst liquid carrier; and removing the catalyst liquid carrier to produce a catalyst-ionomer cake comprising the ion exchange material and the catalyst;

heating the catalyst-ionomer cake at a temperature of at least 100° C., wherein at least a portion of the ion exchange material is bound to the catalyst;

providing electrode liquid carrier; and dispersing the catalyst-ionomer-cake in the electrode liquid carrier to produce an electrode layer composition comprising the catalyst, the ion exchange material and the electrode liquid carrier in which at least a portion of the ion exchange material is bound to the catalyst.

The provision of an electrode layer composition in which at least a portion of the ion exchange material is bound to the catalyst can advantageously be used to produce an electrode on an electrolyte membrane in the manufacture of a membrane electrode assembly. This can lead to an increase in the performance of an electrochemical device containing such an MEA, for instance a fuel cell. Such a performance increase may mitigate a voltage drop (also known as over-voltage) in the mass transport region of the polarization curve of an electrochemical device like a fuel cell, particularly under wet conditions.

The term "catalyst composition" according to this disclosure encompasses a liquid composition comprising ion exchange material, catalyst and catalyst liquid carrier. The term "catalyst composition" is synonymous to catalyst ink or catalyst ink composition and those terms can be used interchangeably. The catalyst composition is an intermediate product to produce an electrode layer composition according to this disclosure.

The term "electrode layer composition" according to this disclosure encompasses a liquid composition comprising catalyst, ion exchange material and electrode liquid carrier in which at least a portion of the ion exchange material is bound to the catalyst. The term "electrode layer composition" is synonymous to electrode ink or electrode ink composition and those terms can be used interchangeably. The electrode layer composition will be applied as a layer on at least one side of an electrolyte membrane to form an electrode.

Returning to the process of the first aspect, in another embodiment the step of providing a catalyst composition comprises the steps of:

providing a catalyst, catalyst liquid carrier and ion exchange material; and combining the catalyst, catalyst liquid carrier and ion exchange material to produce the catalyst composition.

In another embodiment, the step of combining the catalyst, catalyst liquid carrier and ion exchange material comprises the steps of:

combining the catalyst and catalyst liquid carrier;

homogenizing the catalyst and catalyst liquid carrier to produce a catalyst dispersion comprising the catalyst and catalyst liquid carrier;

combining the catalyst dispersion with the ion exchange material to produce the catalyst composition.

In another embodiment of the process, the step of combining the catalyst dispersion with the ion exchange material further comprises the step of homogenizing the catalyst dispersion combined with the ion exchange material to produce the catalyst composition.

In a further embodiment of the process, the step of dispersing the catalyst-ionomer cake in the electrode liquid carrier comprises combining the catalyst-ionomer cake and electrode liquid carrier.

In a further embodiment of the process, the step of dispersing the catalyst-ionomer cake in the electrode liquid carrier comprises homogenizing the catalyst-ionomer cake and the electrode liquid carrier to produce the electrode layer composition.

In a further embodiment of the process, the step of homogenizing comprises ultrasonic homogenizing, wet jet milling, and/or mechanical shear via rotor-stator or cowles blade. In one embodiment the step of homogenizing comprises ultrasonic homogenizing done by submerging the mixing vessel containing the liquid composition in an ultrasonic bath filled with water. The ultrasonic homogenization can be carried out at power in the range of from 100 to 1100 W, for a duration of from 2.5 hours to 15 minutes. Preferably the ultrasonic homogenization is carried out at an energy in the range of from 200 to 1000 W, for a duration of 2 hours to 30 minutes.

In an embodiment of the process, the step of removing the catalyst liquid carrier to produce a catalyst-ionomer cake may comprise a drying step, or other known treatments to remove the catalyst liquid carrier from the catalyst composition. In one embodiment the drying of the catalyst composition removes the catalyst liquid carrier from the catalyst composition, to provide a catalyst-ionomer cake comprising the catalyst and the ion exchange material. The catalyst-ionomer cake may be substantially free from the catalyst liquid carrier.

The process described produces an intermediate catalyst-ionomer cake and further an electrode layer composition in which at least a portion of the ion exchange material is bound to the catalyst. This is achieved by heating the catalyst-ionomer cake, for instance to a temperature above the glass transition temperature, $T_g$, of the ion exchange material to soften the ion exchange material and facilitate bonding of the ion exchange material to the catalyst particles. Consequently, the heating temperature may not be lower than the glass transition temperature of the ion exchange material.

Thus, in an embodiment of the process, the heating of the catalyst-ionomer cake is carried out at a temperature above the glass transition temperature of the ion exchange material.

In a further embodiment of the process, the catalyst-ionomer cake is heated at a temperature of at least 110° C. to provide the electrode layer composition. Preferably the catalyst-ionomer cake may be heated at a temperature of at least 120° C. to provide the electrode layer composition.

In a further embodiment of the process, the catalyst-ionomer cake may be heated at a temperature of no more than 200° C. to provide the electrode layer composition. The catalyst-ionomer cake may be heated at a temperature of no more than 160° C. or at a temperature of no more than 140° C. to provide the electrode layer composition.

In a further embodiment of the process, the catalyst-ionomer cake may be heated at a temperature in the range of from 100° C. to 200° C. to provide the electrode layer composition. The catalyst-ionomer cake may be heated at a temperature in the range of from 110° C. to 160° C. to provide the electrode layer composition. The catalyst-ionomer cake may be heated at a temperature in the range of from 100° C. to 140° C. to provide the electrode layer composition. Preferably, the catalyst-ionomer cake is heated at a temperature in the range of from 120° C. to 140° C. to provide the electrode layer composition In a further embodiment of the process, the catalyst-ionomer cake may be heated at a temperature in the range of from 100° C. to 120° C. for a time of from 2 hours up to 3 hours. In a further embodiment of the process, the catalyst-ionomer cake may be heated at a temperature in the range of from 120° C. to 140° C. for a time of from 1 hour up to 2 hours.

In a further embodiment of the process, the catalyst liquid carrier may comprise water. The concentration of water in the catalyst liquid carrier may be at least 25% by volume of the catalyst liquid carrier, on a mixing basis of the volume of the components of the catalyst liquid carrier prior to mixing. The concentration of water in the catalyst liquid carrier may be at least 40% by volume of the catalyst liquid carrier. Preferably, the concentration of water in the catalyst liquid carrier may be at least 50% by volume of the catalyst liquid carrier. More preferably, the concentration of water in the catalyst liquid carrier may be at least 60% by volume of the catalyst liquid carrier. Still more preferably, the concentration of water in the catalyst liquid carrier may be at least 70% by volume of the catalyst liquid carrier. Most preferably, the concentration of water in the catalyst liquid carrier may be at least 75% by volume of the catalyst liquid carrier.

In a further embodiment of the process, the catalyst liquid carrier may comprise one or more $C_1$-$C_4$ alcohols. Preferably the one or more $C_1$-$C_4$ alcohols may comprise one or more $C_2$-$C_4$ alcohols. Preferably, the one or more $C_1$-$C_4$ alcohols comprise at least of the group of ethanol, 1-propanol, and 2-propanol or combinations thereof. The concentration of alcohol in the catalyst liquid carrier may be less than 75% by volume of the catalyst liquid carrier; or less than 60% by volume; or less than 50% by volume; or less than 40% by volume; or less than 30% by volume, based upon the total volume of the catalyst liquid carrier on a mixing basis of the volume of the components of the catalyst liquid carrier prior to mixing.

In a further embodiment of the process, the catalyst liquid carrier may comprise water and one or more $C_1$-$C_4$ alcohols.

In a further embodiment of the process, the concentration of water in the catalyst liquid carrier may be in the range of from 25% to 99% by volume of the catalyst liquid carrier on a mixing basis with the balance being one or more $C_1$-$C_4$ alcohols. The concentration of water in the catalyst liquid carrier may be in the range of from 40% to 95% by volume of the catalyst liquid carrier with the balance being one or more $C_1$-$C_4$ alcohols. Preferably, the concentration of water in the catalyst liquid carrier may be in the range of from 50% to 90% by volume of the catalyst liquid carrier with the balance being one or more $C_1$-$C_4$ alcohols. More preferably, the concentration of water in the catalyst liquid carrier may be in the range of from 60% to 85% by volume of the catalyst liquid carrier with the balance being one or more $C_1$-$C_4$ alcohols. Still more preferably, the concentration of water in the catalyst liquid carrier may be in the range of from 70% to 85% by volume of the catalyst liquid carrier with the balance being one or more $C_1$-$C_4$ alcohols. Most preferably, the concentration of water in the catalyst liquid carrier may be in the range of from 75% to 85% by volume of the catalyst liquid carrier with the balance being one or more $C_1$-$C_4$ alcohols.

In a further embodiment of the process, the electrode liquid carrier may comprise water. The concentration of water in the electrode liquid carrier may be at least 25% by volume of the electrode liquid carrier, on a mixing basis of the volume of the components of the electrode liquid carrier prior to mixing. The concentration of water in the electrode liquid carrier may be at least 40% by volume of the electrode liquid carrier. Preferably, the concentration of water in the electrode liquid carrier may be at least 50% by volume of the electrode liquid carrier. More preferably, the concentration of water in the electrode liquid carrier may be at least 60% by volume of the electrode liquid carrier. Still more preferably, the concentration of water in the electrode liquid carrier may be at least 70% by volume of the electrode liquid carrier. Most preferably, the concentration of water in the electrode liquid carrier may be at least 75% by volume of the electrode liquid carrier.

In a further embodiment of the process, the electrode liquid carrier may comprise one or more $C_1$-$C_4$ alcohols. Preferably the one or more $C_1$-$C_4$ alcohols may comprise one or more $C_2$-$C_4$ alcohols. Preferably, the one or more $C_1$-$C_4$ alcohols comprise at least one of the group of ethanol 1-propanol and 2-propanol or any combinations thereof. The concentration of alcohol in the electrode liquid carrier may be less than 75% by volume of the electrode liquid carrier; or less than 60% by volume; or less than 50% by volume; or less than 40% by volume; or less than 30% by volume, based upon the total volume of the electrode liquid carrier on a mixing basis of the volume of the components of the electrode liquid carrier prior to mixing. In a further embodiment of the process, the catalyst liquid carrier may comprise water and one or more $C_1$-$C_4$ alcohols.

In a further embodiment of the process, the electrode liquid carrier may comprise water and one or more $C_1$-$C_4$ alcohols.

In a further embodiment of the process, the concentration of water in the electrode liquid carrier may be in the range of from 25% to 99% by volume of the electrode liquid carrier on a mixing basis with the balance being one or more $C_1$-$C_4$ alcohols. The concentration of water in the electrode liquid carrier may be in the range of from 40% to 95% by volume of the electrode liquid carrier with the balance being one or more $C_1$-$C_4$ alcohols. Preferably, the concentration of water in the electrode liquid carrier may be in the range of from 50% to 90% by volume of the electrode liquid carrier with the balance being one or more $C_1$-$C_4$ alcohols. More preferably, the concentration of water in the electrode liquid carrier may be in the range of from 60% to 85% by volume of the electrode liquid carrier with the balance being one or more $C_1$-$C_4$ alcohols. Still more preferably, the concentration of water in the electrode liquid carrier may be in the range of from 70% to 85% by volume of the electrode liquid carrier with the balance being one or more $C_1$-$C_4$ alcohols. Most preferably, the concentration of water in the electrode liquid carrier may be in the range of from 75% to 85% by volume of the electrode liquid carrier with the balance being one or more $C_1$-$C_4$ alcohols.

In another embodiment of the process, the step of providing electrode liquid carrier may further comprise:
providing further ion exchange material;
and the step of dispersing the catalyst-ionomer-cake in the electrode liquid carrier may further comprise the step of:
combining the catalyst-ionomer-cake with the further ion exchange material such that the electrode layer composition comprises the catalyst, the ion exchange material, the further ion exchange material and the electrode liquid carrier in which at least a portion of the ion exchange material is bound to the catalyst.

In such an embodiment, the further ion exchange material may be free i.e. not bound to the catalyst. This is because the further ion exchange material is added to the composition after the heating step. The further ion exchange material may be the same as, or different to, the ion exchange material of the catalyst composition and catalyst-ionomer-cake e.g., it may have the same proton conducting group or a different proton conducting group and/or the same molecular weight or different molecular weight and/or the same polymer backbone or a different polymer backbone.

In another embodiment of the process, the step of providing electrode liquid carrier may further comprise:

providing further catalyst;

and the step of dispersing the catalyst-ionomer-cake in the electrode liquid carrier may further comprise the step of:

combining the catalyst-ionomer-cake with the further catalyst such that the electrode layer composition comprises the catalyst, the further catalyst, the ion exchange material and the electrode liquid carrier in which at least a portion of the ion exchange material is bound to the catalyst.

In such an embodiment, the ion exchange material may not be bound to the further catalyst. This is because the first catalyst is added to the composition after the heating step. The further catalyst may be the same as, or different to, the catalyst of the catalyst composition and catalyst-ionomer-cake e.g., the catalytic component and/or the catalyst support of the catalyst and further catalyst may be the same or different and/or the particle size distribution of the catalyst and the further catalyst may be the same or different.

In another embodiment of the process, the step of providing electrode liquid carrier may further comprise:

providing further liquid carrier;

and the step of dispersing the catalyst-ionomer-cake in the electrode liquid carrier may further comprise the step of combining the catalyst-ionomer-cake with the further liquid carrier such that the electrode layer composition comprises the catalyst, the ion exchange material, the electrode liquid carrier and the further liquid carrier, in which at least a portion of the ion exchange material is bound to the catalyst.

Thus, the electrode layer composition comprises catalyst, ion exchange material and electrode liquid carrier in which at least a portion of the ion exchange material is bound to the catalyst and may optionally further comprise one or more of further ion exchange material, further catalyst and further liquid carrier.

In another embodiment of the process, the catalyst or any further catalyst may comprise a catalytic component and a catalyst support.

The catalyst support may be a carbon particulate. The catalyst support of the catalyst may be the same as or different to that of any further catalyst.

In another embodiment of the process, the catalytic component may comprise one or more catalytic components. The one or more catalytic components may be selected from the group comprising Pt, Ir, Ni, Co, Pd, Ti, Sn, Ta, Nb, Sb, Pb, Mn, Ru and Fe, their oxides, and mixtures thereof. The one or more first catalytic components comprising the catalyst may be the same as or different to that of the one of more catalytic components of any further catalyst. Preferably the one or more catalytic components of the catalyst are different from the one or more catalytic components of any further catalyst.

In another embodiment of the process, the catalyst loading, in terms of the catalytic component(s) in the electrode layer composition may be in the range of from 0.05 to 0.45 $mg/cm^2$ after the removal of the liquid carrier.

In another embodiment of the process, the weight ratio of ion exchange material to catalyst support in the catalyst composition may be less than or equal to 1.40; or less than or equal to 1.30; or less than or equal to 1.20.

In another embodiment of the process, the volume ratio of ion exchange material to catalyst in the catalyst composition may be less than or equal to 1.61; or less than or equal to 1.50; or less than or equal to 1.38.

In another embodiment of the process, the weight ratio of ion exchange material to catalyst support in the catalyst composition may be in the range of from 0.8 to 1.40. Preferably the weight ratio of ion exchange material to catalyst support in the catalyst composition may be in the range of from 0.9 to 1.30. More preferably the weight ratio of ion exchange material to catalyst support in the catalyst composition may be in the range of from 0.8 to 1.20.

In another embodiment of the process, the volume ratio of ion exchange material to catalyst in the catalyst composition may be in the range of from 0.92 to 1.38.

In another embodiment of the process, the electrode layer composition may have a bound ratio, which is the weight ratio of the ion exchange material bound to the catalyst compared to the total amount of ion exchange material in the electrode layer composition, of at least 0.3. Preferably the bound ratio is at least 0.4. More preferably the bound ratio is at least 0.5.

In another embodiment of the process, the ion exchange material of the electrode layer composition comprises at least one ionomer. The at least one ionomer may comprise a proton conducting polymer. The proton conducting polymer preferably comprises a perfluorosulfonic acid or a hydrocarbon. The at least one ionomer comprising perfluorosulfonic acid may have a density of not lower than about 1.9 g/cc at 0% relative humidity.

In another embodiment of the process, the electrode layer composition may comprise solids in a range of from 1 to 10 vol %, preferably in a range of from 2 to 8 vol %. The solids may comprise the catalyst and ion exchange material and any other components not soluble in the liquid carrier.

In another embodiment of the process, the electrode layer composition may have a viscosity of about 30-200 mPa·s at 100 1/s.

In a second aspect, there is provided an electrode layer composition obtainable or obtained by the process of the first aspect and its embodiments.

In a third aspect, there is provided an electrode layer composition comprising ion exchange material, catalyst and electrode liquid carrier wherein at least a portion of the ion exchange material is bound to the catalyst and the electrode layer composition has a bound ratio of at least 0.3, wherein the bound ratio is the weight ratio of the ion exchange material bound to the catalyst compared to the total weight of the ion exchange material in the electrode layer composition.

In one embodiment of the third aspect, the bound ratio may be at least 0.4. Preferably the bound ratio is at least 0.5.

In a fourth aspect, there is provided a process for the manufacture of a membrane electrode assembly component, said process comprising at least the steps of:

providing a first electrode layer composition, the first electrode layer composition being an electrode layer composition obtainable or obtained by the process of the first aspect or an electrode layer composition according to the third aspect, said first electrode layer composition comprising a first catalyst, first ion exchange material and first electrode liquid carrier, in which at least a portion of the first ion exchange material is bound to the first catalyst;

applying the first electrode layer composition to a first side of an electrolyte membrane to provide a layer of the first electrode layer composition on the first side of the electrolyte membrane; and heating the layer of the first electrode layer composition on the electrolyte membrane to remove first electrode liquid carrier from the first electrode layer composition to provide a first electrode on the electrolyte membrane, wherein the first electrode comprises the first catalyst and the first ion exchange material, to produce a membrane electrode assembly component comprising the first electrode and the electrolyte membrane.

In one embodiment of the fourth aspect, the process is a process for the manufacture of a membrane electrode assembly, the process further comprising the steps of:

providing a second electrode layer composition, the second electrode layer composition being an electrode layer composition obtainable or obtained by the process of the first aspect or an electrode layer composition according to the third aspect, said second electrode layer composition comprising a second catalyst, second ion exchange material and second electrode liquid carrier, in which at least a portion of the second ion exchange material is bound to the second catalyst;

applying the second electrode layer composition to a second side of the electrolyte membrane, the second side opposite to that of the first side of the electrolyte membrane, to provide a layer of the second electrode layer composition on the second side of the electrolyte membrane; and heating the layer of the second electrode layer composition on the electrolyte membrane to remove second electrode liquid carrier from the second electrode layer composition to provide a second electrode on the electrolyte membrane, wherein the second electrode comprises the second catalyst and the second ion exchange material to provide a membrane electrode assembly comprising, in order, the first electrode, the electrolyte membrane, and the second electrode.

In another embodiment of the process of the fourth aspect, the second electrode layer composition may be the same as or different to the first electrode layer composition in terms of one or more of the group selected from the catalyst, the ion exchange material, and the electrode liquid carrier.

In another embodiment of the process of the fourth aspect, the heating of the layer of the first electrode layer composition and the heating of the layer of the second electrode layer composition may occur simultaneously or sequentially. Preferably the heating of the layer of the first electrode layer composition and the heating of the layer of the second electrode layer composition is carried out sequentially such that the layer of the first electrode layer composition is heated to provide the first electrode before the second electrode layer composition is applied to the second side of the electrolyte membrane.

In another embodiment of the process of the fourth aspect, the first electrode may have a first side and an opposite second side, the first side of the first electrode in contact with the first side of the electrolyte membrane, and wherein the process further comprises the steps of:

providing a first gas diffusion layer; and applying the first gas diffusion layer to the second side of the first electrode to provide a membrane electrode assembly comprising, in order, the first gas diffusion layer, the first electrode, the electrolyte membrane and the second electrode.

In another embodiment of the process of the fourth aspect, the second electrode may have a first side and an opposite second side, the first side of the second electrode in contact with the second side of the electrolyte membrane, and wherein the process further comprises the steps of:

providing a second gas diffusion layer; and applying the second gas diffusion layer to the second side of the second electrode to provide a membrane electrode assembly comprising, in order, the first gas diffusion layer, the first electrode, the electrolyte membrane, the second electrode and the second gas diffusion layer.

In another embodiment of the fourth aspect, the first electrode and the second electrode may be electronically conductive.

In another embodiment of the process of the fourth aspect, the electrolyte membrane comprises an ion exchange material. The ion exchange material of the electrolyte membrane may have the same composition as the first ion exchange material of the first electrode (and therefore the first electrode layer composition) and/or the second ion exchange material of any second electrode (and therefore the second electrode layer composition) i.e., the ion exchange materials may have the same chemical composition and properties. Alternatively, the ion exchange material of the electrolyte membrane may have a different composition than the first ion exchange material of the first electrode (and therefore the first electrode layer composition) and/or the second ion exchange material of any second electrode (and therefore the second electrode layer composition) i.e. the ion exchange materials may have different chemical compositions and/or properties etc.

The ion exchange material of the electrolyte membrane may form a polymer electrolyte membrane. The polymer electrolyte membrane may comprise at least one ionomer. The at least one ionomer of the polymer electrolyte membrane may have a density not lower than about 1.9 g/cc at 0% relative humidity. The at least one ionomer of the polymer electrolyte membrane may comprise a proton conducting polymer. The proton conducting polymer of the polymer electrolyte membrane may comprise perfluorosulfonic acid.

The polymer electrolyte membrane may be a reinforced polymer electrolyte membrane. The reinforced polymer electrolyte membrane may further comprise a microporous support. The microporous support may be a polymeric matrix into which the ion exchange material is embedded. The microporous support may support the ion exchange material or ionomer, adding structural integrity and durability to the resulting reinforced polymer electrolyte membrane. The ion exchange material may be at least partially imbibed into the microporous support. The microporous support may be fully imbibed with ion exchange material. Such a microporous support fully imbibed with ion exchange material may be rendered occlusive.

As used herein, a portion of the microporous support is referred to as rendered "occlusive" or "occluded" when the interior volume of that portion has structures that are characterized by low volume of voids, such as less than 10% by volume, and is highly impermeable to gas, as indicated by Gurley numbers larger than 10000 s. Conversely, the interior volume of a portion of the microporous support is referred to as "non-occlusive" or "non-occluded" when the interior volume of that portion has structures that are characterized by large volume of voids, for instance more than or equal to 10% by volume, and is permeable to gas, as indicated by Gurley numbers less than or equal to 10000 s.

The microporous support of the polymer electrolyte membrane may comprise at least one fluorinated polymer. The at least one fluorinated polymer may be selected from the group comprising polytetrafluoroethylene (PTFE), poly(ethylene-co-tetrafluoroethylene) (PETFE), expanded polytetrafluoroethylene (ePTFE), polyvinylidenefluoride (PVDF), expanded polyvinylidene fluoride (ePVDF), expanded poly (ethylene-co-tetrafluoroethylene) (ePETFE) and mixtures thereof. The fluorinated polymer is preferably expanded polytetrafluoroethylene (ePTFE).

Alternatively, the microporous support of the polymer electrolyte membrane may comprise at least one hydrocarbon polymer. The at least one hydrocarbon polymer may be selected from the group comprising polyethylene, polypropylene, polycarbonate, polystyrene, and mixtures thereof.

In another embodiment, the electrolyte membrane may comprise a plurality of electrolyte layers. For instance, a reinforced polymer electrolyte membrane comprising a microporous support may further comprise one or more additional layers of microporous support and/or one or more layers of ion exchange material which are not imbibed into a microporous support i.e. one or more layers of unreinforced ion exchange material or unsupported polymer electrolyte membrane. The one or more layers of ion exchange material which are not imbibed into a microporous support may lie on one or both opposing sides of a microporous support. Alternatively, the electrolyte membrane may comprise a plurality of layers of ion exchange material which are not imbibed into a microporous support i.e. a plurality of layers of unreinforced polymer electrolyte membrane. Thus, the electrolyte membrane first and second surfaces onto which the electrode first compositions are applied may be a layer of reinforced polymer electrolyte membrane or a layer of unreinforced polymer electrolyte membrane.

In a fifth aspect, there is provided a membrane electrode assembly component obtainable or obtained by the process of the fourth aspect and its embodiments.

In another embodiment of the fifth aspect, the membrane electrode assembly component is a fuel cell membrane-electrode assembly.

In a sixth aspect, there is provided a method for the determination of the bound ratio of an electrode layer composition, the electrode layer composition comprising ion exchange material, catalyst and electrode liquid carrier, wherein at least a portion of the ion exchange material is bound to the catalyst, wherein the bound ratio is the weight ratio of the ion exchange material bound to the catalyst compared to the total amount of ion exchange material in the electrode layer composition, the method comprising at least the steps of:

providing the electrode layer composition by the process of the first or second aspects and their embodiments;
 determining the weight ratio of ion exchange material to catalyst or catalyst support in the electrode layer composition;
 separating the electrode layer composition to provide a liquid layer comprising electrode liquid carrier and unbound ion exchange material and a sediment layer comprising catalyst and ion exchange material bound to the catalyst;
 extracting the liquid layer to provide an isolated sediment layer;

determining the weight ratio of ion exchange material to catalyst or catalyst support in the isolated sediment layer; and
 calculating the bound ratio by dividing the weight ratio of ion exchange material to catalyst or catalyst support in the isolated sediment layer by the weight ratio of ion exchange material to catalyst or catalyst support in the electrode layer composition.

In one embodiment of the sixth aspect, the separating of the electrode layer composition to provide a liquid layer and a sediment layer comprises centrifuging the electrode layer composition.

In another embodiment of the sixth aspect, the extracting of the liquid layer comprises extracting the liquid layer by syringe.

In another embodiment of the sixth aspect, the weight ratio of ion exchange material to catalyst support in the electrode layer composition is calculated from the amounts, by weight, of ion exchange material and catalyst added to the catalyst liquid carrier to provide the catalyst composition.

In another embodiment of the sixth aspect, the determining of the weight ratio of ion exchange material to catalyst support in the sediment layer is carried out by thermogravimetric analysis of the sediment layer or a portion thereof.

BRIEF DESCRIPTION OF THE FIGURES

In the Figures, identical reference numerals have been used for the same or equivalent features of the membrane electrode assemblies disclosed herein.

FIG. 2 shows a schematic flow diagram of a method for the determination of the bound ratio of an electrode layer composition according to embodiments described herein, wherein the bound ratio is the weight ratio of the ion exchange material bound to the catalyst compared to the total amount of ion exchange material in the electrode layer composition.

DETAILED DESCRIPTION

Figure 1:
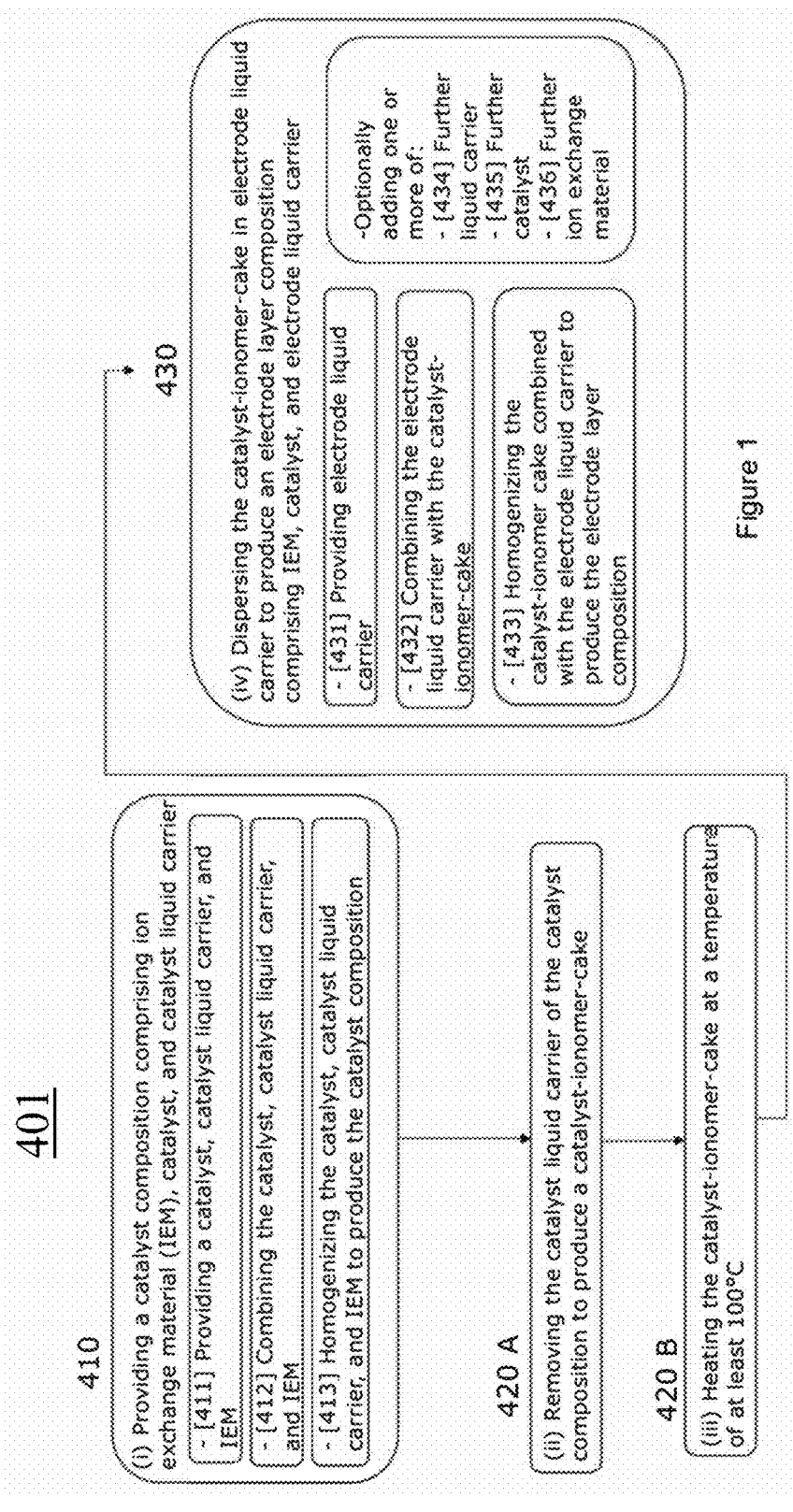
FIG. 1 shows a schematic flow diagram of a process for the manufacture of an electrode layer composition according to embodiments described herein.

It will be apparent that various aspects of the present disclosure can be realized by any number of processes and apparatus configured to perform the intended functions. It should also be noted that the accompanying Figures referred to herein are not necessarily drawn to scale and may be exaggerated to illustrate various aspects of the present disclosure, and in that regard, the figures should not be construed as limiting. Directional references such as "up," "down," "top," "left," "right," "front," and "back," among others are intended to refer to the orientation as illustrated and described in the figure (or figures) to which the components and directions are referencing. Identical reference numerals in different Figures refer to identical features.

It is to be noted that all ranges described herein are exemplary in nature and include any and all values in between. The terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, or 10 percent, typically 10 percent. For a lower limit this represents the lower limit value minus the percentage of the lower limit and for an upper limit this represents the limit value plus the percentage of the lower limit.

In addition, all references cited herein are incorporated by reference in their entireties.

FIG. 1 shows a schematic flow diagram 401 of a process for the manufacture of an electrode layer composition for a membrane electrode assembly. The electrode layer composition comprises an ion exchange material, a catalyst, and an electrode liquid carrier. At least a portion of the ion exchange material is bound to the catalyst.

The electrode layer composition may have a bound ratio, which is the weight ratio of the ion exchange material bound to the catalyst compared to the total amount of ion exchange material in the electrode layer composition, of at least 0.3. Preferably the bound ratio is at least 0.4. More preferably the bound ratio is at least 0.5. The determination of the bound ratio is discussed in more detail in the test methods below.

In a first step 410, a catalyst composition comprising ion exchange material, catalyst and catalyst liquid carrier is provided.

In a second step 420a, the catalyst liquid carrier is removed from the catalyst composition by forming a catalyst-ionomer cake.

In a third step 420b, the catalyst-ionomer cake is heated at a temperature of at least 100° C. wherein at least a portion of the ion exchange material is bound to the catalyst.

In a fourth step 430, the catalyst-ionomer-cake is dispersed in an electrode liquid carrier to provide an electrode layer composition comprising the ion exchange material, the catalyst and the electrode liquid carrier in which at least a portion of the ion exchange material is bound to the catalyst.

There is no particular restriction on the catalyst in the catalyst composition, catalyst-ionomer-cake and electrode layer composition, and any known catalyst can be used, such as those typically used for an anode or a cathode of a fuel cell. The nature of the catalyst may vary widely. The catalyst may comprise a catalytic component and a catalyst support. The catalytic component may comprise noble metals, transition metals, or alloys thereof. The catalytic component may comprise one or more of Pt, Ir, Ni, Co, Pd, Ti, Sn, Ta, Nb, Sb, Pb, Mn, Ru and Fe, their oxides, and mixtures thereof, and are not limited to elemental metals. For example, the catalyst may also comprise iridium oxide, a platinum-ruthenium alloy, a platinum-iridium alloy, a platinum-cobalt alloy, etc. In some embodiments, the catalyst comprises a core shell catalyst, as described, for example, in US2016/0126560, the entirety of which is incorporated herein by reference.

In some embodiments, the catalyst may comprise a catalyst support, such that it is a supported catalyst. Such supported catalysts may comprise carbon as the catalyst support, preferably carbon black. For example, in some embodiments, the catalyst comprises a supported platinum catalyst, such as platinum on carbon black.

The catalyst loading in terms of the catalytic component (s), in the produced electrode layer composition may be in the range of from 0.05 to 0.45 mg/cm$^2$ after the removal of the electrode liquid carrier. Preferably the catalyst loading is in the range of from 0.1 to 0.3 mg/cm$^2$ after the removal of the electrode liquid carrier. The term "catalyst loading" according to this disclosure refers to the mass-per-geometric area of the catalytic component excluding any catalyst support.

The catalyst (by total weight of the catalyst) may be present in the electrode layer composition in an amount less than about 50 wt. %, less than about 40 wt. %, less than about 35 wt. %, less than about 30 wt. %, less than about 20 wt. %, less than about 10 wt. %, or less than about 9 wt. %, based on a total weight of the electrode layer composition. For example, the catalyst may be present in the electrode layer composition in an amount from 1 wt. % to 50 wt. %, from 1 wt. % to 42 wt. %, or from 3 wt. % to 30 wt. %, based on a total weight of the electrode layer composition.

A suitable ion exchange material for the catalyst composition, catalyst-ionomer-cake and electrode layer composition may be dependent on the application in which the membrane electrode assembly comprising an electrode formed from the electrode layer composition is to be used. The ion exchange material may be chemically and thermally stable in the environment in which the membrane electrode assembly is to be used. A suitable ion exchange material for fuel cell applications may include a cation exchange material, an anion exchange material, or an ion exchange material containing both cation and anion exchange capabilities. Mixtures of ion exchange materials may also be employed.

The ion exchange material may comprise at least one ionomer. The at least one ionomer may have a density not lower than about 1.9 g/cc at 0% relative humidity. The at least one ionomer may comprise a proton conducting polymer or cation exchange material.

The ion exchange material may be selected from the group comprising perfluorosulfonic acid polymers, perfluorocarboxylic acid polymers, perfluorophosphonic acid polymers, styrenic ion exchange polymers, fluorostyrenic ion exchange polymers, polyarylether ketone ion exchange polymers, polysulfone ion exchange polymers, bis(fluoroalkylsulfonyl)imides, (fluoroalkylsulfonyl)(fluorosulfonyl) imides, polyvinyl alcohol, polyethylene oxides, divinyl benzene, metal salts with or without a polymer and mixtures thereof. Examples of suitable perfluorosulfonic acid polymers for use in fuel cell applications include Nafion® (E.I. DuPont de Nemours, Inc., Wilmington, Del., US), Flemion® (Asahi Glass Co. Ltd., Tokyo, JP), Aciplex® (Asahi Chemical Co. Ltd., Tokyo, JP), Aquivion® (SolvaySolexis S.P.A, Italy), and 3M™ (3M Innovative Properties Company, USA) which are commercially available perfluorosulfonic acid copolymers. Other examples of suitable perfluorosulfonic acid polymers for use in fuel cell applications include perfluorinated sulfonyl (co)polymers such as those described in U.S. Pat. No. 5,463,005. The proton conducting polymer preferably comprises perfluorosulfonic acid.

The ion exchange material may be present in the catalyst composition and electrode layer composition in an amount less than about 50 wt. %, less than about 35 wt. %, less than about 8 wt. %, or less than about 0.5 wt. %, based on a total weight of the ion exchange material and liquid carrier in the composition, such as the catalyst composition or electrode layer composition. For example, the ion exchange material may be present in the catalyst composition and electrode layer composition in an amount from 0.5 wt. % to 50 wt. %, based on a total weight of the ion exchange material and liquid carrier in the composition.

The weight ratio of ion exchange material to carbon as catalyst support (I/C) in the catalyst composition may be less than or equal to 1.40; or less than or equal to 1.30; or less than or equal to 1.20. Typically, the weight ratio of ion exchange material to carbon as catalyst support (I/C) in the catalyst composition may be in the range of from 0.8 to 1.40. Preferably the weight ratio of ion exchange material to carbon as catalyst support (I/C) in the catalyst composition may be in the range of from 0.9 to 1.30. More preferably the weight ratio of ion exchange material to carbon as catalyst support (I/C) in the catalyst composition may be in the range of from 0.8 to 1.20. Such preferred ratios lead to improved bound ratios in the electrode layer composition after heating of the catalyst-ionomer cake.

In some embodiments the catalyst of the catalyst composition is used without a catalyst support and therefore the weight of the catalyst will be used to calculate the weight ratio of ion exchange material to catalyst instead.

The catalyst liquid carrier in the catalyst composition and the electrode liquid carrier in the electrode layer composition may be the same or different.

The catalyst liquid carrier in the catalyst composition and the electrode liquid carrier in the electrode layer composition may independently comprise water. When the catalyst liquid carrier or the electrode liquid carrier comprises water, the catalyst composition and electrode layer composition may be an aqueous catalyst composition and aqueous electrode layer composition.

In embodiments, the catalyst liquid carrier in the catalyst composition and the electrode liquid carrier in the electrode layer composition may be different. In a further embodiment, the water concentration of the catalyst liquid carrier may be greater than the water concentration of the electrode liquid carrier. The amount of water in the electrode liquid carrier may depend on how the electrode layer on at least one surface of the electrolyte membrane is formed.

The catalyst composition may include significant amounts of water (as component of the catalyst liquid carrier). Also, by using a judicious order of mixing (water before alcohol), the mixing of the catalyst composition is simplified because the water suppresses the risk of fire when the organic solvent is added to the catalyst. Furthermore, it is acceptable to have lower solids in the catalyst composition than the electrode layer composition, because precise control of rheology and concentration for thin-film coating is not required for the catalyst composition. A preferred choice of catalyst liquid carrier is a mixture of water and ethanol.

The electrode layer composition may include minimized amounts of water (as component of the electrode liquid carrier). Water tends to lead to cracking of the electrode. Water may also help dissolve the ionomer, which could undesirably lower the bound ratio. In order to enable the electrode layer composition to form the electrode, the correct solids level in the electrode liquid carrier (e.g., to achieve suitable rheology and concentration to enable uniform thin film coating that produces the desired electrode loading in few coating passes) has to be chosen. Furthermore, the electrode liquid carrier should disperse the catalyst-ionomer cake without dissolving too much ionomer (which would lower the bound ratio). In one preferred embodiment, 100% 1-propanol is chosen as electrode liquid carrier. In another preferred embodiment, a mixture of water and alcohol is chosen as electrode liquid carrier. Fire is not as much of a concern in the production of the electrode layer composition because the presence of the bound ionomer on the surface of the catalyst lowers the risk of fire.

The concentration of water in the catalyst liquid carrier or the electrode liquid carrier may be independently at least 25% by volume of the liquid carrier on a mixing basis. The concentration of water in the catalyst liquid carrier or electrode liquid carrier may be independently at least 40% by volume of the liquid carrier. Preferably, the concentration of water in the catalyst liquid carrier or the electrode liquid carrier may be independently at least 50% by volume of the liquid carrier. More preferably, the concentration of water in the catalyst liquid carrier or electrode liquid carrier may be at least 60% by volume of the liquid carrier. Still more preferably, the concentration of water in the catalyst liquid carrier or electrode liquid carrier may be at least 70% by volume of the liquid carrier. Most preferably, the concentration of water in the catalyst liquid carrier or electrode liquid carrier may be at least 75% by volume of the liquid carrier.

In a further embodiment of the process, the catalyst liquid carrier or electrode liquid carrier may further independently comprise one or more $C_1$-$C_4$ alcohols. The one or more $C_1$-$C_4$ alcohols may preferably comprise one or more $C_2$-$C_4$ alcohols, such as one or both of ethanol and 1-propanol.

The concentration of alcohol in the catalyst liquid carrier or electrode liquid carrier may be less than 75% by volume of the liquid carrier on a mixing basis; or less than 60% by volume; or less than 50% by volume; or less than 40% by volume; or less than 30% by volume, based upon the total volume of the liquid carrier.

The catalyst liquid carrier or electrode liquid carrier preferably independently comprise water and one or both of ethanol and 1-propanol.

The concentration of water in the catalyst liquid carrier or electrode may be independently in the range of from 25% to 99% by volume of the liquid carrier on a mixing basis, with the balance being one or more $C_1$-$C_4$ alcohols. The concentration of water in the catalyst liquid carrier or electrode liquid carrier may be in the range of from 40% to 95% by volume of the liquid carrier with the balance being one or more $C_1$-$C_4$ alcohols. Preferably, the concentration of water in the catalyst liquid carrier or electrode liquid carrier may be in the range of from 50% to 90% by volume of the liquid carrier with the balance being one or more $C_1$-$C_4$ alcohols. More preferably, the concentration of water in the catalyst liquid carrier or electrode liquid carrier may be in the range of from 60% to 85% by volume of the liquid carrier with the balance being one or more $C_1$-$C_4$ alcohols. Still more preferably, the concentration of water in the catalyst liquid carrier or electrode liquid carrier may be in the range of from 70% to 85% by volume of the liquid carrier with the balance being one or more $C_1$-$C_4$ alcohols. Most preferably, the concentration of water in the catalyst liquid carrier or electrode liquid carrier may be in the range of from 75% to 85% by volume of the liquid carrier with the balance being one or more $C_1$-$C_4$ alcohols.

The catalyst liquid carrier or electrode liquid carrier may further comprise a glycol ether such as dipropylene glycol (DPG) or propylene glycol methyl ether (PGME).

The catalyst composition and electrode layer composition may independently comprise liquid carrier in an amount of greater than about 35 wt. %, greater than about 50 wt. %, greater than about 70 wt. %, greater than about 80 wt. %, or greater than about 90 wt. %, based on a total weight of the ionomer and liquid carrier in the composition, such as the catalyst composition or electrode layer composition. For example, the catalyst liquid carrier or electrode liquid carrier may be independently present in the catalyst composition and electrode layer composition in an amount from about 35 wt. % to about 99 wt. %, based on a total weight of the ion exchange material and liquid carrier in the composition.

It will be appreciated that the specific concentrations of the components in the electrode layer compositions that are required to achieve the benefits herein described may vary widely within the ranges listed, depending, for example, on the electrolyte membrane on which the electrode layer composition is to be applied, since the wettability of the electrolyte membrane will vary depending, for example, on porosity, pore size, and surface energy of the electrolyte. The desired catalyst loading in the electrode layer composition and on the electrolyte membrane will also impact the desired component concentrations. As a result, the above concentrations are provided as guidelines, understanding that some degree of optimization, well within the purview of those of ordinary skill in the art, may be necessary depending on the chosen electrolyte membrane and desired catalyst loading.

The catalyst composition and electrode layer composition may further comprise a water-insoluble component comprising one or both of a water-insoluble alcohol and a water-insoluble carboxylic acid. In some embodiments, the water-insoluble component comprises a $C_{5+}$ alcohol, a $C_{5+}$ carboxylic acid, or a combination thereof. As used herein, $C_{5+}$ refers to compounds having five or more carbon atoms. Preferably, the water-insoluble component comprises a $C_5$-$C_{10}$ alcohol, a $C_5$-$C_{10}$ carboxylic acid, or a combination thereof. Thus, in some embodiments, the water-insoluble component comprises a water-insoluble alcohol, such as, for example, 1-pentanol, 1-hexanol, 1-heptanol, 1-octanol, 2-ethyl-1-hexanol, 1-nonanol, 1-decanol, or a combination thereof. In some embodiments, the water-insoluble component comprises a water-insoluble carboxylic acid, such as, for example, n-pentanoic acid, n-hexanoic acid, n-heptanoic acid, n-octanoic acid, n-nonanoic acid, n-decanoic acid or a combination thereof. As used here, the term "a combination thereof" refers to any combination of two or more species in the immediately preceding list. Branched alcohols and/or branched carboxylic acids are also contemplated, as are various combinations of $C_{5+}$ alcohols and $C_{5+}$ carboxylic acids.

The water-insoluble component may be present in the catalyst composition and electrode layer composition in an amount less than about 20 wt. %, less than about 15 wt. %, less than about 10 wt. %, less than about 8 wt. %, less than about 6 wt. %, or less than about 4 wt. %, based on a total weight of the ion exchange material and liquid carrier in the composition, such as the catalyst composition or electrode layer composition. For example, the water-insoluble component may be present in the catalyst composition and electrode layer composition in an amount from 0.5 wt. % to 20 wt. %, e.g., from 0.5 wt. % to 15 wt. %, from 0.5 wt. % to 10 wt. %, from 1 wt. % to 20 wt. %, from 5 wt. % to 20 wt. %, or from 10 wt. % to 20 wt. %, based on a total weight of the ion exchange material and liquid carrier in the composition, such as the catalyst composition or electrode layer composition. The weight percentages recited herein should be considered as applying to the collective amount of all water-insoluble components for embodiments employing more than one water-insoluble component.

Such electrode layer compositions comprising the above water-insoluble component produce low contact angles when the compositions are applied to an electrolyte membrane, such that the electrode layer compositions satisfactorily wet the electrolyte membrane even with little or no use of water-soluble alcohols and show low reticulation during the drying process. "Low reticulation" as used herein is intended to mean any film that contracts less than 15% in width, less than 15% in length, and for which the final area of the film comprised less than 15% de-wetting defects. Reticulation was assessed by pipetting 60-80 microliters of the electrode layer composition onto the electrolyte membrane, then using a pipet bulb to spread the electrode layer composition on the electrolyte membrane to form a film with a length of 4-6 cm and a width of 7-15 mm, then drying the film in less than 1 minute with a heat gun while visually inspecting.

Without being limited by theory, it is speculated that the ion exchange material, which is not considered a surfactant, surprisingly emulsifies the water-insoluble component. The electrode layer compositions have adequate stability to permit coating by the manufacturing processes described below The electrode layer compositions according to various embodiments may include an emulsion or a suspension such that the electrode layer compositions may maintain a single phase during the depositing process (i.e., the electrode layer compositions do not separate into an "oil-rich layer" and "water-rich layer" too rapidly to prevent application to the electrolyte membrane and heating to remove the liquid carrier). According to various embodiments, the electrode layer compositions remain homogenous where the components (e.g., oil, water, etc.) are uniformly distributed during at least the step of application to the electrolyte membrane.

Returning to FIG. 1 and the first step 410 of providing the catalyst composition, this can be achieved by the following optional sub-steps 411-413. In a first sub-step 411 a catalyst, catalyst liquid carrier and ion exchange material can be provided. In a second sub-step 412 the catalyst, catalyst liquid carrier and ion exchange material can be combined. In a third sub-step 413 of providing the catalyst composition, the catalyst, catalyst liquid carrier and ion exchange material can be homogenized to produce a catalyst composition. The homogenizing may be carried out by known methods like ultrasonic homogenization or wet jet mill homogenization. The ultrasonic homogenization can be carried out at a power in the range of from 100 to 1100 W, for a duration of from 2.5 hrs to 15 minutes. It will be apparent that the lower the homogenization power, the longer the homogenization duration, such that homogenizing at 100 W should be carried out for a longer duration such as 2.5 hrs and homogenizing at 1100 W can be carried out for a shorter duration of 15 minutes. Preferably the ultrasonic homogenization is carried out at an energy in the range of from 200 to 1000 W, for a duration of 2 hours to 30 minutes.

In the second step 420A the catalyst composition is treated to remove the catalyst liquid carrier. The removing of the catalyst liquid carrier can be done by drying the catalyst composition at a temperature of about 80° C. Any other known treatment to remove the catalyst liquid carrier can be used. As result of the removal of the catalyst liquid carrier a catalyst-ionomer cake has been formed. The catalyst-ionomer cake is therefore substantially free from, or free from catalyst liquid carrier. Hence, the term "cake" is used to describe the dried catalyst composition.

In a third step 420B the catalyst-ionomer cake can then be heated at a temperature of at least 100° C. The heating of the catalyst-ionomer cake provides at least a portion of the ion exchange material is bound to the catalyst. This can be achieved by heating the catalyst-ionomer cake to a temperature above the glass transition temperature, Tg, of the ion exchange material to soften the ion exchange material and facilitate bonding of the ion exchange material to the catalyst particles. Consequently, the heating temperature may not be lower than the glass transition temperature of the ion exchange material. Consequently, the heating of the catalyst-ionomer cake can be carried out at a temperature above the glass transition temperature of the ion exchange material.

The catalyst-ionomer cake may be heated at a temperature of at least 110° C. or preferably at a temperature of at least 120° C. Furthermore, the catalyst-ionomer cake may be heated at a temperature of no more than 200° C. Many ion exchange materials decompose at temperatures above 200° C. Preferably the catalyst-ionomer cake may be heated at a temperature of no more than 160° C. or more preferably at a temperature of no more than 140° C.

Typically, the catalyst-ionomer cake may be heated at a temperature in the range of from 100° C. to 200° C. Preferably the catalyst-ionomer cake may be heated at a temperature in the range of from 110° C. to 160° C. and more preferably at a temperature in the range of from 100° C. to 140° C. Most preferably, the catalyst-ionomer cake is heated at a temperature in the range of from 120° C. to 140° C.

In the fourth step 430 of the process for the manufacture of the electrode layer composition, the heated catalyst-ionomer cake is dispersed in the electrode liquid carrier to produce the electrode layer composition. The electrode layer composition comprises the catalyst, ion exchange material and electrode liquid carrier. At least a portion of the ion exchange material remains bound to the catalyst as a result of the heating step 420B.

The electrode liquid carrier can be used to optimize the properties of the electrode layer composition for deposition onto an electrolyte membrane, while the type and concentration of the catalyst liquid carrier provided in the catalyst composition can be used to optimize the binding of the ion exchange material to the catalyst in the manufacture of the electrode layer composition i.e. optimize the bound ratio. The dispersing fourth step 430 may comprise a first sub-step 431 in which the electrode liquid carrier can be provided.

The electrode liquid carrier may be the same as or different to the catalyst liquid carrier as discussed above. Preferable the electrode liquid carrier comprises water. The electrode liquid carrier may further comprise one or more $C_1$-$C_4$ alcohols. More preferably the electrode liquid carrier comprises water and one or both of ethanol and 1-propanol.

In a second sub-step 432 of the fourth process step 430, the catalyst-ionomer cake may be combined with the electrode liquid carrier.

The catalyst-ionomer cake combined with the electrode liquid carrier can then be homogenized to produce the electrode layer composition in a third sub-step 433. The homogenization may be ultrasonic homogenization or wet jet mill homogenization and can be carried out under conditions independently selected from those discussed for the homogenization to produce the catalyst liquid carrier. In this way, an electrode layer composition can be provided which can be applied to an electrolyte membrane for the production of an electrode in a MEA component or MEA.

The dispersing process 430 may include one or more further optional steps.

In one optional step 434, a further liquid carrier may be added. The further liquid carrier might be useful to change the coating properties on an electrolyte membrane or for reducing the Pt loading of the electrode. The further liquid carrier may be independently selected from the liquid carrier of the catalyst composition and their amounts. The further liquid carrier may comprise water. The further liquid carrier may further comprise one or more $C_1$-$C_4$ alcohols. Preferably the further liquid carrier comprises water and one or both of ethanol and 1-propanol.

In another optional step 435, further catalyst may be added to the composition. The further catalyst may be the same as, or different to the catalyst present in the catalyst-ionomer-cake. As the further catalyst is added after the heating step 420B which binds at least a portion of the ion exchange material to the catalyst, the further catalyst is free from ion exchange material i.e., has substantially no bound IEM.

In another optional step 436, further ion exchange material may be added to the electrode layer composition. The further ion exchange material may be the same as, or different to the ion exchange material present in the catalyst-ionomer-cake. As the further ion exchange material is added after the heating step 420B which binds at least a portion of the ion exchange material to the catalyst, the further ion exchange material is substantially not bound to the catalyst.

Any further ion exchange material, any further catalyst and any further liquid carrier may be independently as described above for the ion exchange material, catalyst, catalyst liquid carrier and electrode liquid carrier.

In this way, an electrode layer composition can be provided which can be applied to an electrolyte membrane for the production of an electrode in a MEA component or MEA.

The above process can provide an electrode layer composition comprising ion exchange material, catalyst, and liquid carrier wherein at least a portion of the ion exchange material is bound to the catalyst and the electrode layer composition has a bound ratio of at least 0.3, wherein the bound ratio is the weight ratio of the ion exchange material bound to the catalyst compared to the total amount of the ion exchange material in the electrode layer composition.

Preferably the bound ratio may be at least 0.4 and more preferably the bound ratio may be at least 0.5.

The electrode layer composition may optionally further comprise one or more of further ion exchange material, further catalyst and further liquid carrier. One or both of the further ion exchange material and further catalyst may be unbound i.e. the further ion exchange material may not be bound to catalyst and the further catalyst may not be bound to ion exchange material. This allows the bound ratio of ion exchange material to catalyst to be adjusted during the formation of the electrode layer composition.

The ion exchange material, catalyst, liquid carrier and any further liquid carrier may be as described above for the process of the manufacture of an electrode layer composition or dispersed electrode layer composition.

Process for the Manufacture of a Membrane Electrode Assembly Component and MEA

A membrane electrode assembly (MEA) component is comprised of an electrolyte membrane and an electrode. Thus, the MEA component may be a two-layer assembly, having layers placed adjacent to one another such as electrode (such as anode or cathode)-electrolyte membrane. As used herein, an electrode and an electrolyte membrane are sheet-like structures such that two of the three orthogonal dimensions defining the membrane are larger than the third dimension, which represents the electrode or membrane thickness. Typically, the thickness of the electrode or membrane is 0.5, 0.2 or 0.1 times or less the size of the other two orthogonal dimensions. Preferably, the thickness of the electrode or membrane is an order of magnitude smaller than the other two orthogonal dimensions.

The following discussion uses the terms "electrolyte membrane" and "electrolyte" interchangeably. The electrolyte membrane may be a polymer electrolyte membrane (PEM) and the electrode may be one of an anode or a cathode. Typically, a membrane electrode assembly (MEA) is comprised of an electrolyte membrane with an anode electrode on one side and a cathode electrode on the other side i.e. a membrane electrode assembly component with a second electrode such that the first and second electrodes are on opposing sides of the electrolyte membrane. Thus, the MEA may be a three-layer assembly, having the layers placed adjacent to each other as anode-electrolyte membrane-cathode. Additionally, the MEA may also include Gas Diffusion Layers (GDLs) attached to the side of each electrode opposite to that side in contact with the electrolyte membrane. If GDLs are attached to both electrodes then the final MEA is considered a five-layer assembly, having the layers placed adjacent to each other as GDL-Anode-Electrolyte membrane-Cathode-GDL in the final MEA.

A MEA component can be produced by forming an electrode directly on an electrolyte membrane. This can be achieved by applying the electrode layer composition or dispersed electrode layer composition described above to an electrolyte membrane to provide a layer of electrode layer composition on the electrolyte membrane and then heating the layer of electrode layer composition to remove the liquid carrier to provide an electrode on the electrolyte membrane. The layer of electrode layer composition is a wet layer, whilst the electrode is a substantially dry layer.

Ion exchange material which is "free" or "unbound" is mobile in an electrode layer composition for coating and can move with the liquid carrier. It has been discovered that this movement produces a concentration gradient of ion exchange material in the dried electrode in which a lower concentration of ion exchange material is present in the portion of the electrode nearest to the electrolyte membrane, relative to a higher concentration of ion exchange material in the portion of the electrode nearest to the electrode surface. This can lead to a reduction in the performance of the electrochemical device containing such an MEA, such as a voltage drop (also known as over voltage) in the mass transport region of the polarization curve of an electrochemical device like a fuel cell, particularly under wet conditions.

An electrode layer composition as described herein in which at least a portion of the ion exchange material is bound to the catalyst renders the bound portion of ion exchange material considerably less mobile than the corresponding unbound ion exchange material, because the former is attached to catalyst particles. This provides a more even distribution of ion exchange material in the dried electrode, compared to one formed from an electrode layer composition for coating which has not been heat treated to bind ion exchange material to the catalyst. There is therefore less free ion exchange material to migrate to the portion of the layer of the electrode layer composition near its outer surface during heating to evaporate the liquid carrier. Therefore, any reduction of porosity at the surface of the dry electrode by the filling of pores is reduced in the compositions described herein. Correspondingly, there is less free ion exchange material to be lost from the portion of the layer of electrode layer composition near the electrolyte membrane. Therefore, any reduction in ion transport in the portion of the electrode nearest to the electrolyte membrane is also reduced in the compositions described herein. This can lead to an increase in the performance of the electrochemical device containing such an MEA, for instance a fuel cell under dry conditions as well as under wet conditions. Such a performance increase may mitigate a voltage drop (also known as overvoltage) in the mass transport region of the polarization curve of an electrochemical device of for example a fuel cell, particularly under wet conditions.

The disclosed processes for the manufacture of an MEA include steps as described below and illustrated in the FIGS. 3 and 4. Although described as sequential steps for the purposes of explanation, this disclosure contemplates that in practice the steps may be performed in any order or simultaneously unless stated otherwise.

An MEA may be produced continuously or discontinuously as described herein. An MEA may be continuously produced, for instance using a roll feed and/or roll winder, deposition apparatus, and a heating apparatus. The roll feed and/or roll winder may be rollers or alternative means of web conveyance. The deposition apparatus may be a slot die or alternative means of film coating. The heating apparatus may be a convection oven or alternative means of wet film drying.

Alternatively, the MEA may be produced in a discontinuous manner, with the various process steps carried out separately, with optional storage of any intermediate between the process steps. For instance, the first and second electrodes may be applied in separate process lines, with optional intermediate storage of the membrane electrode assembly comprising the first electrode and the electrolyte membrane, prior to application of any second electrode.

FIGS. 3 to 7 show schematic diagrams of membrane electrode assembly components according to several embodiments of the disclosure. The left side of each figure is shown in a staggered fashion to distinguish the several layers of each construction. All figures are schematic, not drawn to scale and the depiction may not reflect the actual alignment or edge design in practice.

Figure 3:
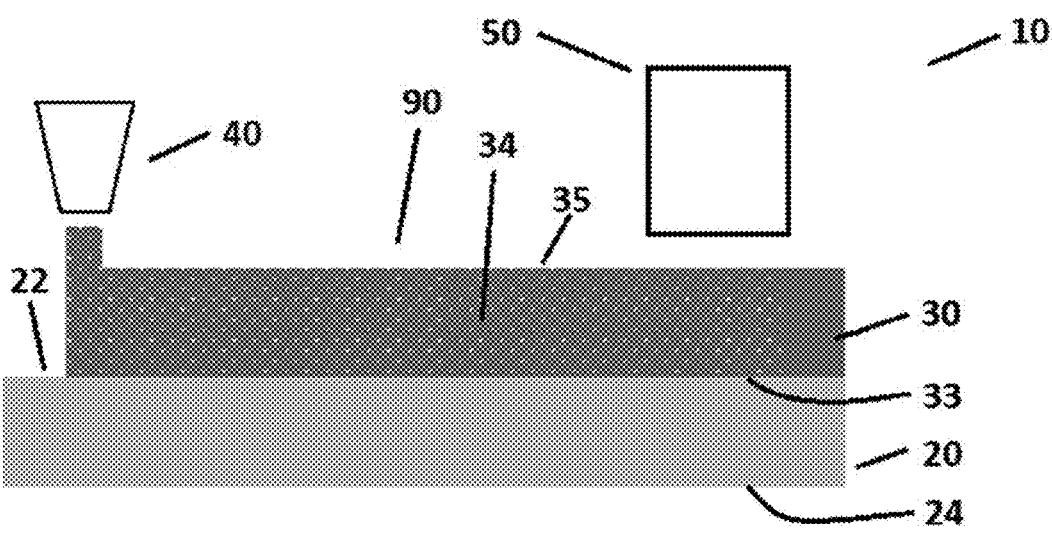
FIG. 3 shows a schematic diagram of a process for applying a first electrode layer composition to an electrolyte membrane to form a first electrode on the electrolyte membrane.

FIG. 3 shows a schematic process 10 for the application of a layer of a first electrode layer composition 34 to an electrolyte membrane 20. The first electrode layer composition 34 is an electrode layer composition prepared as previously described such that at least a portion of the ion exchange material is bound to the catalyst. The first electrode layer composition is a liquid composition.

The electrolyte membrane 20 may comprise an ion exchange material. The ion exchange material of the electrolyte membrane may be a polymer electrolyte membrane. The polymer electrolyte membrane may comprise at least one ionomer, such as an ionomer having a density not lower than about 1.9 g/cc at 0% relative humidity. The at least one ionomer of the polymer electrolyte membrane may comprise a proton conducting polymer. The proton conducting polymer of the polymer electrolyte membrane may comprise perfluorosulfonic acid.

The electrolyte membrane 20 may be a reinforced polymer electrolyte membrane comprising a microporous support and an ionomer such as a proton-conducting polymer impregnated in the microporous support as described in Bahar et al, U.S. Pat. No. RE 37,307. The ion exchange material may be fully embedded within the microporous support. The ion exchange material may include more than one ion exchange material in the form of a mixture of ion exchange materials.

The electrolyte membrane 20 may include more than one layer of ion exchange material. The layers of ion exchange material may be formed of the same ion exchange material. Alternatively, the layers of ion exchange material may be formed of differention exchange materials. Optionally, at least one of the layers of ion exchange material may comprise a mixture of ion exchange materials. The ion exchange material may include at least one ionomer.

The microporous support may have a first surface and an opposing second surface. The ion exchange material may form a layer on the first surface, on the second surface, or both on the first surface and the second surface. The ion exchange material may be partially embedded within the microporous support leaving a non-occlusive portion of the microporous support closest to the first surface, second surface or both. The non-occlusive portion may be free of any of the ion exchange material. The non-occlusive portion may include a coating of ion exchange material to an internal surface of the microporous support.

The electrolyte membrane 20 may comprise a single microporous support layer. The electrolyte membrane 20 may comprise more than one microporous support layer. When the electrolyte membrane 20 comprises at least two microporous support layers, the composition of each microporous support layer may be the same, or it may be different.

The microporous support may be a microporous polymer structure. The microporous polymer structure may comprise at least one fluorinated polymer e.g., a polymeric fluorocarbon material or at least one hydrocarbon polymer e.g., a polymeric hydrocarbon material. The at least one fluorinated polymer may be selected from the group comprising polytetrafluoroethylene (PTFE), poly(ethylene-co-tetrafluoroethylene) (PETFE), expanded polytetrafluoroethylene (ePTFE), polyvinylidene fluoride (PVDF), expanded polyvinylidene fluoride (ePVDF), expanded poly(ethylene-co-tetrafluoroethylene) (ePETFE) and mixtures thereof. The at least one fluorinated polymer is preferably an expanded polytetrafluoroethylene (ePTFE) membrane. The at least one hydrocarbon polymer may be selected from the group comprising polyethylene, polypropylene, polycarbonate, polystyrene, and mixtures thereof.

The electrolyte membrane 20 may optionally be provided on a releasable backing layer (not shown in FIG. 3). The electrolyte membrane 20 may have a first side 22 and an opposing second side 24. The second side 24 of the electrolyte membrane may be in contact with the releasable backing layer.

The releasable backing layer can be a film or fabric, such as a woven material or a non-woven material, such as a web. Suitable releasable backing layers may comprise woven materials which may include, for example, scrims made of woven fibers of expanded porous polytetrafluoroethylene; webs made of extruded or oriented polypropylene or polypropylene netting, commercially available from Conwed, Inc. of Minneapolis, Minn.; and woven materials of polypropylene and polyester, from Tetko Inc., of Briarcliff Manor, N.Y. Suitable non-woven materials for the releasable backing layer may include, for example, a spun-bonded polypropylene from Reemay Inc. of Old Hickory, Tenn. Other suitable releasable backing layers can include web of polyethylene ("PE"), polystyrene ("PS"), cyclic olefin copolymer ("COC"), cyclic olefin polymer ("COP"), fluorinated ethylene propylene ("FEP"), perfluoroalkoxy alkanes ("PFAs"), ethylene tetrafluoroethylene ("ETFE"), polyvinylidene fluoride ("PVDF"), polyetherimide ("PEI"), polysulfone ("PSU"), polyethersulfone ("PES"), polyphenylene oxide ("PPO"), polyphenyl ether ("PPE"), polymethylpentene ("PMP"), polyethyleneterephthalate ("PET"), or polycarbonate ("PC"). The releasable backing layer may also include a protective layer, which can include polyethylene (PE), polystyrene ("PS"), cyclic olefin copolymer ("COC"), cyclic olefin polymer ("COP"), fluorinated ethylene propylene ("FEP"), perfluoroalkoxy alkanes ("PFAs"), ethylene tetrafluoroethylene ("ETFE"), polyvinylidenefluoride ("PVDF"), polyetherimide ("PEI"), polysulfone ("PSU"), polyethersulfone ("PES"), polyphenylene oxide ("PPO"), polyphenyl ether ("PPE"), polymethylpentene ("PMP"), polyethyleneterephthalate ("PET"), or polycarbonate ("PC"). The releasable backing layer optionally may include a reflective layer that includes a metal substrate (e.g., an aluminum substrate). Preferably, the releasable backing layer comprises a polymer sheet substrate (obtained from DAICEL VALUE COATING LTD., Japan) comprising PET and a protective layer of cyclic olefin copolymer (COC). In use, the protective layer of COC is in contact with the electrolyte membrane 20.

As shown in FIG. 3 a first electrode layer composition 34 can be applied to the first side 22 of the electrolyte membrane 20 via the first electrode layer composition deposition apparatus 40. The first electrode layer composition 34 comprises a first catalyst, a first ion exchange material, a first electrode liquid carrier and optionally one or more of a first further ion exchange material, first further catalyst and first further liquid carrier, in which at least a portion of the first ion exchange material is bound to the first catalyst as discussed above. The electrolyte membrane 20 may be positioned on roll feed and/or roll winder. The electrolyte membrane 20 may be on a releasable backing layer (not shown) as discussed above, in which case the releasable backing layer is in contact with the roll feed and/or roll winder such that the releasable backing layer lies between the electrolyte membrane and the roll feed and/or roll winder. The application of the first electrode layer composition 34 forms a wet layer of the first electrode layer composition 34 on the first side 22 of the electrolyte membrane 20.

The term "applying" is intended to include but not limited to various means of applying liquid compositions, such as slot die coating, slide die coating, curtain coating, gravure coating, reverse roll coating, spray coating, knife-over-roll coating, and dip coating. The first electrode layer composition deposition apparatus 40 may therefore be a slot die coating apparatus, a slide die coating apparatus, a curtain coating apparatus, a gravure coating apparatus, a reverse roll coating apparatus, a spray coating apparatus, a knife-over-roll coating apparatus, or a dip coating apparatus. A slot die coating apparatus is preferred.

The layer of the first electrode layer composition 34 may have a first side 33 and an opposing second side 35, with the first side 33 in contact with the first side 22 of the electrolyte membrane 20.

The wet first multi-layer assembly 90, comprising in order, an optional releasable backing layer, electrolyte membrane 20 and wet layer of first electrode layer composition 34 may then be heated to remove the first electrode liquid carrier from the layer of first electrode layer composition 34. In this way, the wet layer 34 may be substantially dried to form a first electrode 30.

For instance, the first multi-layered assembly 90 may be conveyed to any suitable first heating device 50, such as an oven, drier or IR lamp, via the roll feed and/or roll winder. The heating may be carried out at a temperature greater than 60° C., greater than 75° C., greater than 100° C., greater than 130° C., from 60° C. to 160° C., or from 100° C. to 150° C., optionally at a drying time from 0.01 to 10 minutes, e.g., from 0.1 to 8 minutes, from 0.1 to 5 minutes, from 0.1 to 2 minutes, or from 0.1 to 1 minute. The drying of the wet layer of first electrode layer composition 34 forms a dried first electrode 30 comprising first catalyst and first ion exchange material and any optional first further catalyst and first further ion exchange material on the electrolyte membrane 20. The dried first electrode 30 can be formed as a continuous phase i.e. the first electrode 30 may be free from internal interfaces.

During drying, the first electrode liquid carrier and any first further liquid carrier evaporates from the uncovered second side 35 of the layer of the first electrode layer composition 34. This evaporation sets up a diffusion gradient across the wet layer of the first electrode layer composition, producing a net movement of first electrode liquid carrier and any first further liquid carrier to the surface of second side 35. Unbound ion exchange material is mobile in the first electrode liquid carrier and can move with the liquid carrier as it migrates to the surface of the second side 35 of the layer of first electrode layer composition 34 to evaporate. The concentration of the unbound ion exchange material can therefore increase in the portion of the layer of first electrode layer composition 34 near second side 35 during heating to remove the first electrode liquid carrier and any first further liquid carrier.

Unmitigated, this movement of first ion exchange material can lead to a relatively lower concentration of first ion exchange material in the portion of the dried first electrode 30 nearest to the electrolyte membrane, causing diminished ion transport to the first catalyst particles in the electrode once dried. Furthermore, a relatively higher concentration of first ion exchange material in the portion of the first electrode nearest to the electrode surface and any gas diffusion layer (and opposite to the side of the first electrode in contact with the electrolyte membrane), can reduce the porosity at the surface of the first electrode by the filling of pores with the first ion exchange material, reducing the volume of the triple phase boundary present.

However, in the processes described herein, at least a portion of the first ion exchange material is bound to the first catalyst in the layer of first electrode layer composition 34. This bound first ion exchange material is significantly less mobile in the first electrode liquid carrier than unbound first ion exchange material such that an accumulation of first ion exchange material at or near the surface of the first electrode is mitigated.

In this way, the heating step provides a membrane electrode assembly component, comprising in order, an optional releasable backing layer, an electrolyte membrane 20 and a first electrode 30.

Figure 5:
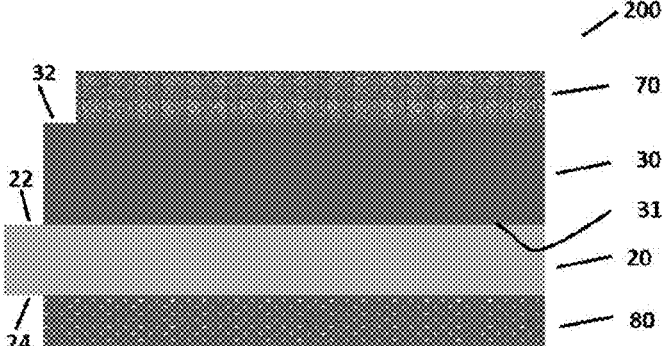
FIG. 5 shows a schematic diagram of a membrane electrode assembly component produced according to an embodiment of the described process, the MEA component comprising in order, a first releasable support layer, a first electrode, an electrolyte membrane and a releasable backing layer.

In an optional step not shown in the process of FIG. 3, a first releasable support layer may be applied to the first electrode 30 after the heating step. Thus, a MEA component 200 is provided as shown in FIG. 5, comprising in order, an optional first releasable support layer 70, a first electrode 30, an electrolyte membrane 20 and a releasable backing layer 80. The first electrode 30 may comprise a first side 31 and an opposing second side 32. The first side 31 of the first electrode 30 is in contact with the first side 22 of the electrolyte membrane 20 in the MEA component. The electrolyte membrane 20 may comprise a second side 24 opposite to that of first side 22 and the releasable backing layer 80 may be in contact with the second side 24 of the electrolyte membrane. The first releasable support layer may be applied to the second side 32 of the first electrode 30 after heating the layer of the first electrode layer composition 34 on the electrolyte membrane 20 to remove first electrode liquid carrier, but before the application of any second electrode layer composition to the second side 24 of the electrolyte membrane 20 as discussed below.

The first releasable support layer protects the second surface of the first electrode and provides support and stability to the MEA for subsequent processing steps. The first releasable support layer may comprise a single layer or film, which can be formed of a plastics material. The first releasable support layer can be a film or fabric, such as a woven material, or a non-woven material, such as a web.

Figure 4:
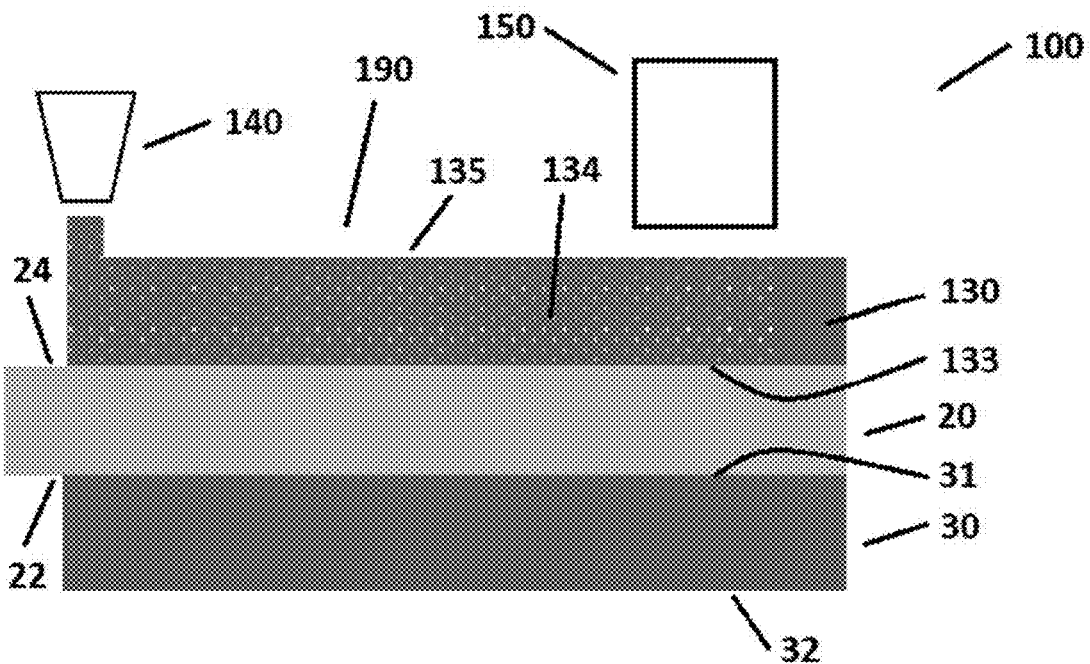
FIG. 4 shows a schematic diagram of a process for applying a second electrode layer composition to an electrolyte membrane having a first electrode on its opposite side to form a second electrode on the electrolyte membrane on the opposite side to the first electrode.

FIG. 4 shows a schematic process 100 for the application of a layer of a second electrode layer composition 134 to the second side 24 of the electrolyte membrane 20. The second electrode layer composition 134 is an electrode layer composition prepared as previously described such that at least a portion of the ion exchange material is bound to the catalyst. The second electrode layer composition is a liquid composition.

The first side 22 of the electrolyte membrane 20 is in contact with the first electrode 30 produced as previously described. If the electrolyte membrane 20 is provided with a releasable backing layer in contact with the second side 24 of the electrolyte membrane 20, the releasable backing layer can be separated to uncover the second side 24 of the electrolyte membrane 20 before the application of the second electrode layer composition 134.

The electrolyte membrane 20 can be positioned with the first electrode 30 in contact with a roll feed and/or roll winder with the second side 24 of the electrolyte membrane 20 uppermost and uncovered. If an optional first releasable support layer (not shown) is present on the second side 32 of the first electrode 30, the first releasable support layer can be located in contact with the roll feed and/or roll winder, between the first electrode 30 and roll feed and/or roll winder.

In a continuous process, the membrane electrode assembly comprising the first electrode 30 on the electrolyte layer 20 may be flipped or inverted from the production of the first electrode 30 such that the second side 24 of the electrolyte layer 20 is on top of the first electrode 30 and conveyed to a second electrode layer composition deposition apparatus 140, for instance via the roll feed and/or roll winder.

The second electrode layer composition 134 can be applied to the second side 24 of the electrolyte membrane 20 via the second electrode layer composition deposition apparatus 140. The second electrode layer composition 134 comprises a second catalyst, a second ion exchange material, a second electrode liquid carrier and optionally one of more of a second further catalyst, a second further ion exchange material and a second further liquid carrier, in which at least a portion of the second ion exchange material is bound to the catalyst. The first and second catalysts and any first and second further catalysts may be independently the same or different. In some embodiments, the catalyst loading in the first electrode layer composition and second electrode layer composition may be substantially the same after removal of the liquid carrier.

The applying of the second electrode layer composition 134 forms a wet layer of the second electrode layer composition 134 on the second side 24 of the electrolyte membrane 20. The applying can be carried out by one of the means disclosed for applying the first electrode layer composition 34, such that the second electrode layer composition deposition apparatus 140 may be independently selected from those discussed for the first electrode layer deposition apparatus 40.

The layer of the second electrode layer composition 134 may have a first side 133 and an opposing second side 135, with the first side 133 in contact with the second side 24 of the electrolyte membrane 20.

The second multi-layer assembly 190, comprising in order, an optional first releasable support layer (not shown), first electrode 30, electrolyte membrane 20 and wet layer of second electrode layer composition 134 may then be heated to remove the second electrode liquid carrier and any second further liquid carrier from the layer of second electrode layer composition 134. In this way, the wet layer 134 may be substantially dried to form a second electrode 130 comprising second catalyst, second ion exchange material and optionally second further catalyst and second further ion exchange material.

For instance, the second multi-layered assembly may be conveyed to any suitable second heating device 150, such as an oven, drier or IR lamp, via the roll feed and/or roll winder. The heating may be carried out at temperatures and durations independently selected from those described above for the wet layer of first electrode layer composition 34 forming the first electrode 30. The drying of the wet layer of second electrode layer composition 134 forms a dried second electrode 130 on the electrolyte membrane 20. The dried second electrode 130 can be formed as a continuous phase i.e. the second electrode 130 may be free from internal interfaces.

In a similar manner to the heating of the layer of the first electrode layer composition 34, heating evaporates the second electrode liquid carrier and any second further liquid carrier from the uncovered second side 135 of the layer of the second electrode layer composition 134. This evaporation sets up a diffusion gradient across the wet layer of the second electrode layer composition, producing a net movement of liquid carrier to the surface of second side 135. Unbound ion exchange material is mobile in the second electrode liquid carrier and any second further liquid carrier and can move with the liquid carrier as it migrates to the surface of the second side of the layer of second electrode layer composition 134 to evaporate. The concentration of the unbound ion exchange material can therefore increase in the portion of the second electrode layer composition 134 near second side 135 during heating to remove the second liquid carrier and any second further liquid carrier.

Unmitigated, this movement of second ion exchange material can lead to a relatively lower concentration of second ion exchange material in the portion of the dried second electrode nearest to the electrolyte membrane, causing diminished ion transport to the second catalyst particles in the electrode once dried. Furthermore, a relatively higher concentration of second ion exchange material in the portion of the second electrode nearest to the electrode surface and any gas diffusion layer (and opposite to the side of the first electrode in contact with the electrolyte membrane), can reduce the porosity at the surface of the first electrode by the filling of pores with the second ion exchange material, reducing the volume of the triple phase boundary present.

However, in the processes described herein, at least a portion of the second ion exchange material is bound to the second catalyst. This bound second ion exchange material is significantly less mobile in the second electrode liquid carrier and any second further liquid carrier than unbound second ion exchange material such that an accumulation of second ion exchange material at or near the surface of the second electrode is mitigated.

Figure 6:
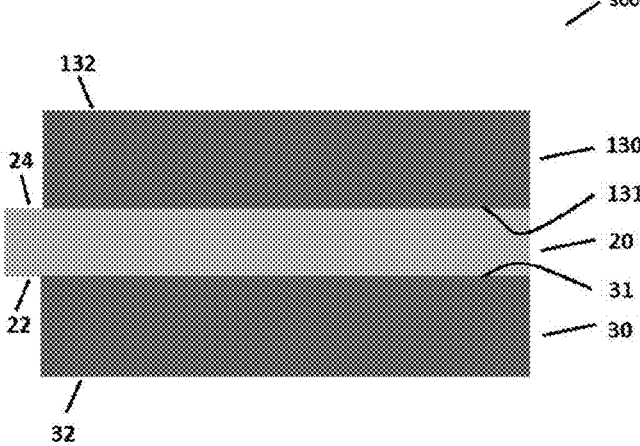
FIG. 6 shows a schematic diagram of a membrane electrode assembly produced according to an embodiment of the described process, the MEA comprising in order, a first electrode, an electrolyte membrane and a second electrode.

In this way, the heating step provides a membrane electrode assembly 200 as shown in FIG. 6, comprising in order, a first electrode 30, an electrolyte membrane 20 and a second electrode 130.

The processes described herein may be provided as a continuous process for producing an MEA in which the electrolyte membrane and any releasable backing layer can be positioned on roll feed and/or roll winder and conveyed to first electrode layer composition deposition apparatus 40 and then first heating apparatus 50. Similarly, the first electrode and electrolyte membrane can be positioned on the same or a different roll feed and/or roll winder and conveyed to second electrode layer composition deposition apparatus 140 and then second heating apparatus 150.

In an alternative embodiment not shown in the Figures, both the layers of first and second electrode layer compositions 34, 134 may be applied to opposing sides of the electrolyte membrane 20 before any heating step. Thus, rather than sequential heating steps of the layers of first and second electrode layer compositions 34, 134, both layers of the first and second electrode layer compositions 34, 134 may be applied to the electrolyte membrane and whilst both as still wet, a single heating step may be carried out to dry the two wet layers 34, 134 simultaneously to provide first and second electrodes 30, 130 as substantially dry layers.

In a further step not shown in the embodiments of FIG. 3 or FIG. 4, a first gas diffusion layer (GDL) may be provided on the membrane electrode assembly. The first GDL 60 may have a first side 61 and an opposing second side 62. The first side 61 of the first GDL 60 may be applied to the second side 35 of the first electrode 30 to provide a membrane electrode assembly comprising, in order, the first gas diffusion layer 60, the first electrode 30, the electrolyte membrane 20 and any second electrode 130. The first gas diffusion layer 60 may be applied to the second side 35 of the first electrode by any conventional technique, such as lamination. For instance, the first GDL can be laminated to the first electrode under pressure and with heating. The first gas diffusion layer may comprise a porous carbon particle layer, such as microporous carbon paper.

If the membrane electrode assembly is provided with a first releasable support layer on the second surface of the first electrode, the process further comprises the step of separating the first releasable support layer from the first electrode before the first gas diffusion layer is applied to the second side of the first electrode.

In a further step not shown in the embodiment of FIG. 4, a second gas diffusion layer 160 may be provided. The second GDL 160 may have a first side 161 and an opposing second side 162. The first side 161 of the second GDL 160 may be applied to the second side 135 of the second electrode 130 to provide a membrane electrode assembly 300 comprising, in order, the first gas diffusion layer 60, the first electrode 30, the electrolyte membrane 20, the second electrode 130 and the second gas diffusion layer 160 as shown in FIG. 6. The second gas diffusion layer may comprise a porous carbon particle layer, such as microporous carbon paper.

Membrane Electrode Assembly

FIG. 6 shows a schematic diagram of a membrane electrode assembly 300 produced according to an embodiment of the described process. The MEA 300 comprises in order, a first electrode 30, an electrolyte membrane 20 and a second electrode 130. The first electrode 30 has a first side 31 and an opposing second side 32. The electrolyte membrane 20 has a first side 22 and an opposing second side 24. The second electrode 130 has a first side 131 and an opposing second side 132. The first side 31 of the first electrode 30 is in contact with the first side 22 of the electrolyte membrane 20. The first side 131 of the second electrode 130 is in contact with the second side 24 of the electrolyte membrane 20.

The catalyst loading of an electrode, such as the first or any second electrode, in terms of the catalytic component, may be in the range of from 0.05 to 0.45 mg/cm², preferably in the range of from 0.1 to 0.3 mg/cm². Typically, the catalytic component comprises platinum for such a range of catalyst loading. The catalyst loading of the first electrode may be the same as or different to the catalyst loading of any second electrode.

The membrane electrode assembly of FIG. 6 may be a fuel cell membrane electrode assembly.

Optionally, the second side 32 of the first electrode 30 may be protected by a first releasable support layer (not shown). Such an MEA comprises in order, a first releasable support layer, a first electrode 30, an electrolyte membrane 20 and a second electrode 130.

Further optionally, the second side 132 of the second electrode 130 may be protected by a second releasable support layer (not shown). Such an MEA comprises in order, a first releasable support layer, a first electrode 30, an electrolyte membrane 20, a second electrode 130 and a second releasable support layer. The second releasable support layer may be independently provided from the same materials as the first releasable support layer disclosed above.

Figure 7:
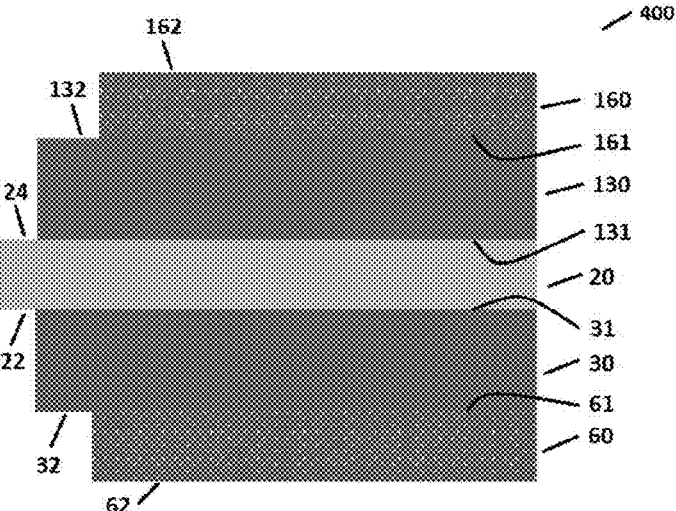
FIG. 7 shows a schematic diagram of a membrane electrode assembly produced according to an embodiment of the described process, the MEA comprising in order, a first gas diffusion layer, a first electrode, an electrolyte membrane, a second electrode and a second gas diffusion layer.

FIG. 7 shows a schematic diagram of a membrane electrode assembly (MEW) 400 produced according to an embodiment of the described process. The MEA 400 comprises in order, a first as diffusion layer 60, a first electrode 30, an electrolyte membrane 20, a second electrode 130 and a second gas diffusion layer 160. The first GDL 60 has a first side 61 and an opposing second side 62. The second GDL 160 has a first side 161 and an opposing second side 162. The first side 61 of the first GDL 60 is in contact with the second side 32 of the first electrode 30. The first side 161 of the second GDL 160 is in contact with the second side 132 of the second electrode 130. The remaining reference numerals are the same as those for FIG. 6.

The membrane electrode assembly of FIG. 7 may be a fuel cell membrane electrode assembly.

Fuel Cell

A fuel cell may be provided with an MEA as described herein, such as an MEA as described in the embodiment of FIG. 7.

When the membrane electrode assembly is a membrane electrode assembly in a fuel cell, the first and second electrodes may have a pore size of less than or equal to about 100 nm. The first and second catalysts may comprise a platinum catalyst supported on carbon black.

Test Methods

Determination of Bound Ratio

The following method was used to determine the bound ratio of an electrode layer composition, the bound ratio being the weight ratio of the ion exchange material bound to the catalyst compared to the total amount of ion exchange material in the electrode layer composition. A schematic flow diagram 500 of the method for the determination of a bound ratio of an electrode layer composition is shown in FIG. 2.

In a first step 510, an electrode layer composition comprising ion exchange material, catalyst, and electrode liquid carrier is provided. The weight ratio of the ion exchange material to catalyst or catalyst support (depending on what form of catalyst is used, unbounded or bounded to a support) in the electrode layer composition can then be calculated at the step 520 or later in the procedure, but prior to the final step of calculating the bound ratio. The weight ratio of the ion exchange material to catalyst or catalyst support in the electrode layer composition represents the ratio of the total weight of ion exchange material to total amount of catalyst or catalyst support in the electrode layer composition. The weight ratio of ion exchange material to catalyst or catalyst support in the electrode layer composition can be calculated from the amounts, by weight, of ion exchange material and catalyst or catalyst support added to the electrode liquid carrier to provide the electrode layer composition.

In a third step 530 the electrode layer composition can then be separated to provide a liquid layer comprising electrode liquid carrier and unbound ion exchange material and a sediment layer comprising ion exchange material bound to the catalyst. The separating of the electrode layer composition may comprise centrifuging the electrode layer composition or allowing it to settle. Centrifugation can be carried out at, for instance, 20 000 rpm for a duration of from 10 to 500 minutes, preferably from 60 to 480 minutes.

In step 540 the liquid layer of the separated electrode layer composition can then be extracted to provide an isolated sediment layer. This extraction can be carried out by drawing the liquid layer of the separated electrode layer composition into a syringe. Extraction of the liquid layer removes the electrode liquid carrier and unbound ion exchange material from the sediment. Once the liquid layer has been extracted, the sediment layer remains as an isolated layer. The sediment layer, substantially free from liquid carrier and unbound ion exchange material, can then be analyzed to determine the amount of ion exchange material bound to the catalyst.

In step 550 the weight ratio of ion exchange material to catalyst or catalyst support in the isolated sediment layer can then be determined. This represents the weight ratio of ion exchange material bound to the catalyst to the total amount of catalyst or catalyst support, as the total amount of catalyst will remain unchanged between the sediment layer and the amount in the initial electrode layer composition. This determination can be carried out by thermogravimetric analysis of the sediment layer or a portion thereof. The thermal decomposition of the bound ion exchange material occurs above 200° C., whilst the catalyst is stable in the region of the thermal decomposition of the bound ion exchange material. Thus, the mass of the sediment or a portion thereof minus the mass of the sediment or a portion thereof after the thermal decomposition of the bound ion exchange material yields the mass of bound ion exchange material present in the sediment layer or portion thereof. This can then be used to calculate the weight ratio of ion exchange material to catalyst or catalyst support in the isolated sediment layer.

In step 560 the bound ratio can then be calculated by dividing the weight ratio of ion exchange material to catalyst support in the isolated sediment layer by the weight ratio of ion exchange material to catalyst support in the electrode layer composition. The bound ratio is preferably expressed as a percentage. The higher the bound ratio, the less free ion exchange material is present in the electrode layer composition and the more ion exchange material bound to the catalyst.

EXAMPLES

The present disclosure will be better understood in view of the following non-limiting example.

Example 1

The electrode layer composition was prepared by combining a catalyst (TEC10F50E-HT of Tanaka Kikinzokou Kogyo K.K., Japan) and a perfluorosulfonic acid ion exchange material (Asahi Glass Co., Ltd, Japan) and a catalyst liquid carrier comprising 50% vol ethanol (commercially available from company Kanto Chemical Co., Japan) with the balance being deionized water to provide a catalyst composition. The resulting catalyst I/C (ionomer to carbon) ratio was 1.39 and 1.6 by weight and by volume respectively. The catalyst composition was mixed by supersonic homogenizer (UP200S from Hielscher Ultrasonics GmbH, Germany) to disperse the catalyst. The catalyst composition was then dried by hot air to remove the liquid carrier to produce a catalyst-ionomer cake. The catalyst-ionomer cake was then heated to a temperature of 140° C. for about 2 hrs. After the catalyst-ionomer cake was cooled, it was combined with an electrode liquid carrier comprising 50% vol ethanol (commercially available from company Kanto Chemical Co., Japan) with the balance being deionized water and then mixed by supersonic homogenizer (UP200S from Hielscher Ultrasonics GmbH, Germany) to produce the electrode layer composition. The resultant electrode layer composition has shown an I/C (Ionomer to carbon) sediment of 0.6 corresponding to an electrode bound ratio of 43%.

Figure 8:
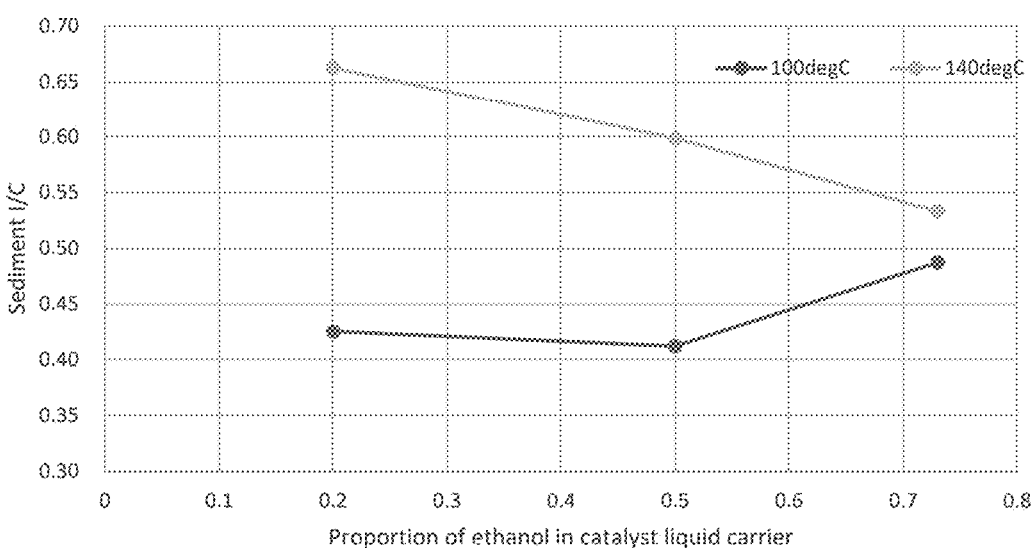
FIG. 8 shows a plot of the ratio of ion exchange material to catalyst support by weight in the sediment layer of electrode layer compositions versus the proportions of ethanol (by volume) in the catalyst liquid carrier for different heating temperatures of the catalyst-ionomer cake.

FIG. 8 shows a plot of the ratio of ion exchange material to catalyst in the sediment layer of an electrode layer composition versus the proportion of ethanol (by volume) in the catalyst liquid carrier of the catalyst composition for different heating temperatures of the catalyst-ionomer cake after drying the catalyst composition. All catalyst-ionomer cakes were combined and homogenized with the same electrode liquid carrier after heating. It is apparent that higher heating temperatures lead to an increase in the amount of ion exchange material bound to the catalyst in the sediment of the electrode layer composition, for a given mass of catalyst and proportion of ethanol in the liquid carrier of the catalyst composition. Furthermore, at the higher heating temperature of 140° C., reducing the proportion of ethanol in the catalyst liquid carrier, in favor of an increased proportion of water, increases the amount of ion exchange material bound to the catalyst in the sediment of the electrode layer composition. At the lower heating temperature of 100° C., increasing the proportion of ethanol in the catalyst liquid carrier, in favor of an increased proportion of water, increases the amount of ion exchange material bound to the catalyst in the sediment of the electrode layer composition.

Figure 9:
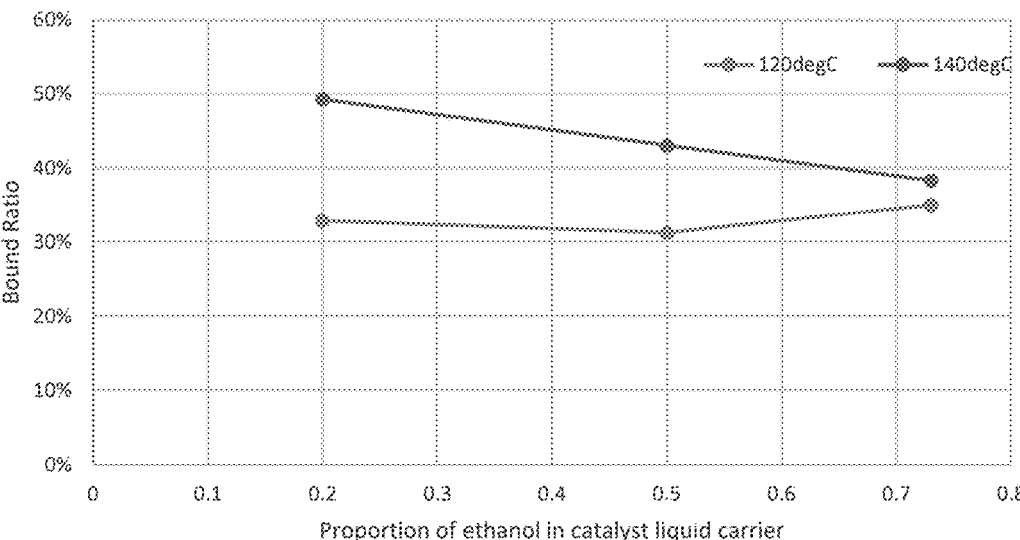
FIG. 9 shows a plot of the bound ratio of electrode layer compositions prepared at different heating temperatures and proportions of ethanol (by volume) in the catalyst liquid carrier.

FIG. 9 shows a plot of the corresponding impact of the proportion (by volume) of ethanol in the catalyst liquid carrier of the catalyst composition on the bound ratio of ionomer in the electrode layer composition for different heating temperatures of the catalyst-ionomer cake after drying the catalyst composition. All catalyst-ionomer cakes were combined and homogenized with the same electrode liquid carrier after heating. Again, higher heating temperatures of the catalyst-ionomer cake produce higher bound ratios of ion exchange material in the electrode layer composition. Furthermore, at the higher heating temperature of 140° C., reducing the proportion of ethanol in the catalyst liquid carrier, in favor of an increased proportion of water, increases the bound ratio i.e. the overall amount of ion exchange material bound to the catalyst, compared to the unbound ion exchange material.

Figure 10:
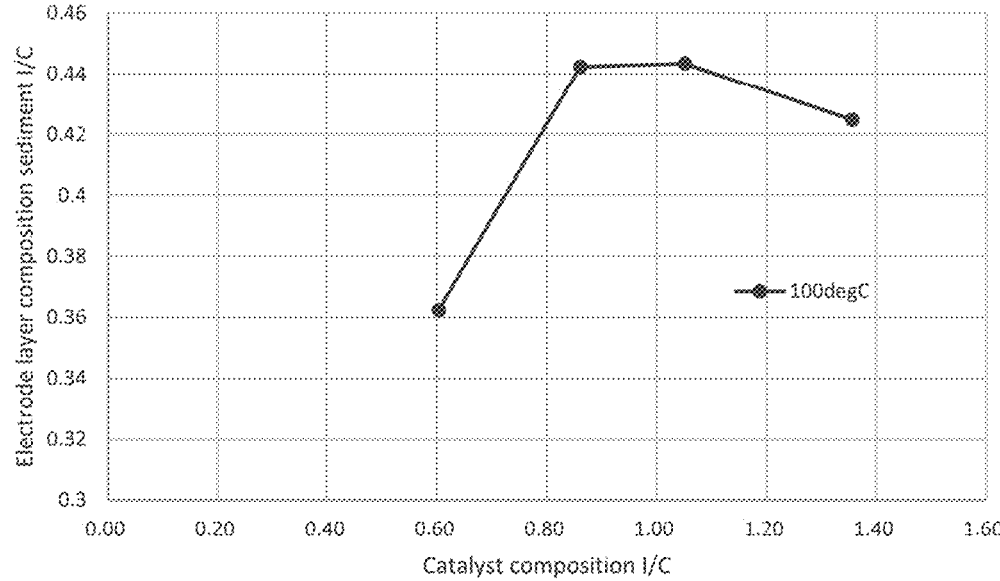
FIG. 10 shows a plot of the ratio of ion exchange material to catalyst support by weight in the sediment of an electrode layer composition prepared by heating at a temperature of 100° C. from catalyst compositions with different initial ratios of ion exchange material to catalyst support by weight.

FIG. 10 shows a plot of the ratio of ion exchange material to catalyst in the sediment layer of an electrode layer composition versus the proportion of ethanol (by volume) in the liquid carrier of the catalyst composition when the catalyst composition is heated at 100° C. It is apparent that the ratio of ion exchange material to catalyst in the sediment of the electrode layer composition, which represents the amount of ion exchange material bound to the catalyst for a given weight of catalyst, increases sharply when the initial ratio of ion exchange material to catalyst in the starting catalyst composition is increased above 0.6, particularly above 0.8.

Figure 11:
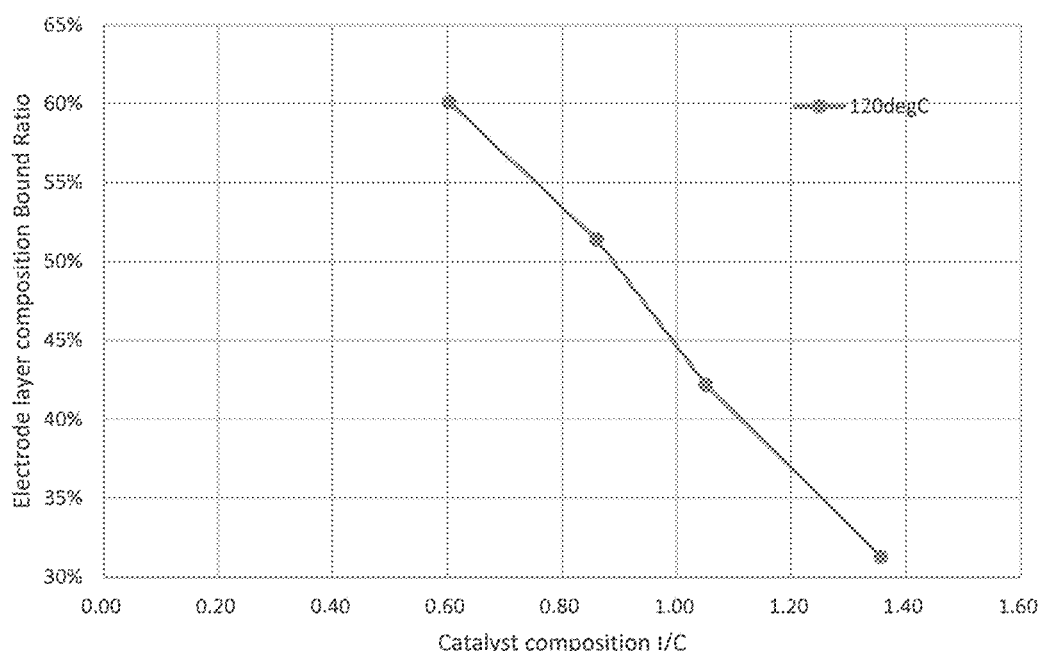
FIG. 11 shows a plot of the bound ratio of electrode layer compositions prepared at a temperature of 100° C. from catalyst compositions with different initial ratios of ion exchange material to catalyst support by weight.

FIG. 11 shows a plot of the corresponding impact of the ratio of ion exchange material to catalyst in the starting catalyst composition on the bound ratio in the electrode layer composition when the catalyst composition is dried and then the catalyst-ionomer cake is heated at 120° C. The bound ratio is increased by decreasing the ratio of ion exchange material to catalyst in the starting electrode layer composition. If the weight ratio of ion exchange material to catalyst before separation is small, the bound ratio increases. When the same amount of ion exchange material binds to the catalyst support at higher weight I/C in the catalyst composition, the total amount of ion exchange material contained in the electrode layer composition is large, such that, the larger the weight ratio of I/C in the catalyst composition, the smaller the bound ratio in the electrode layer composition.

Table 1 summarizes different samples already illustrated in FIGS. 8-11. Catalyst and Electrode liquid carriers described below are balanced with deionized water.

TABLE 1

| Sample # | Catalyst Liquid carrier Ethanol Vol % | Catalyst composition I/C* (Weight ratio) | Catalyst composition I/C* (Volume ratio) | Heating temp. (° C.) | Electrode liquid carrier Ethanol Vol % | Electrode layer composition sediment I/C* (Weight ratio) | Electrode Bound ratio % |
|---|---|---|---|---|---|---|---|
| 1 | 0 | 1.44 | 1.66 | 100 | 0.5 | 0.36 | 25% |
| 2 | 0.5 | 1.39 | 1.60 | 100 | 0.5 | 0.41 | 30% |
| 3 | 0.5 | 1.36 | 1.57 | 120 | 0.5 | 0.42 | 31% |
| 4 | 0.2 | 1.31 | 1.51 | 100 | 0.5 | 0.43 | 32% |
| 5 | 0.2 | 1.47 | 1.70 | 120 | 0.5 | 0.48 | 33% |
| 6 | 0.73 | 1.36 | 1.57 | 120 | 0.5 | 0.48 | 35% |
| 7 | 0.73 | 1.39 | 1.60 | 140 | 0.5 | 0.53 | 38% |
| 8 | 0.73 | 1.25 | 1.44 | 100 | 0.5 | 0.49 | 39% |
| 9 | 0.5 | 1.05 | 1.21 | 120 | 0.5 | 0.44 | 42% |
| 10 | 0.5 | 1.39 | 1.60 | 140 | 0.5 | 0.60 | 43% |
| 11 | 0.2 | 1.34 | 1.55 | 140 | 0.5 | 0.66 | 49% |
| 12 | 0.5 | 0.86 | 0.99 | 120 | 0.5 | 0.44 | 51% |
| 13 | 0.5 | 0.60 | 0.69 | 120 | 0.5 | 0.36 | 60% |

*Ionomer to carbon

While the invention has been described in detail, modifications within the spirit and scope of the invention will be readily apparent to the skilled artisan. It should be understood that aspects of the invention and portions of various embodiments and various features recited above and/or in the appended claims may be combined or interchanged either in whole or in part. In the foregoing descriptions of the various embodiments, those embodiments which refer to another embodiment may be appropriately combined with other embodiments as will be appreciated by the skilled artisan. Furthermore, the skilled artisan will appreciate that the foregoing description is byway of example only and is not intended to limit the invention.

The invention claimed is:

1. A process for the manufacture of an electrode layer composition for a membrane electrode assembly, said process comprising:

providing a catalyst composition comprising an ion exchange material, a catalyst, and a catalyst liquid carrier;

removing the catalyst liquid carrier to produce a catalyst-ionomer cake comprising the ion exchange material and the catalyst;

heating the catalyst-ionomer cake at a temperature of at least 100° C., wherein at least a portion of the ion exchange material is bound to the catalyst;

providing an electrode liquid carrier; and dispersing the catalyst-ionomer cake in the electrode liquid carrier to produce an electrode layer composition comprising the catalyst, the ion exchange material, and the electrode liquid carrier in which at least a portion of the ion exchange material is bound to the catalyst, wherein the electrode layer composition has a bound ratio; wherein the bound ratio is a weight ratio of the ion exchange material bound to the catalyst compared to a total amount of the ion exchange material in the electrode layer composition; and wherein the bound ratio is at least 0.3.

2. The process as claimed in claim 1, wherein the providing the catalyst composition comprises:

providing the catalyst, the catalyst liquid carrier, and the ion exchange material; and combining the catalyst, the catalyst liquid carrier, and the ion exchange material to produce the catalyst composition comprising:

combining the catalyst and the catalyst liquid carrier;

homogenizing the catalyst and the catalyst liquid carrier to produce a catalyst dispersion comprising the catalyst and the catalyst liquid carrier; and combining the catalyst dispersion with the ion exchange material to produce the catalyst composition.

3. The process as claimed in claim 2, wherein the combining the catalyst dispersion with the ion exchange material further comprises homogenizing the catalyst dispersion combined with the ion exchange material to produce the catalyst composition.

4. The process as claimed in claim 1, wherein the removing the catalyst liquid carrier comprises drying the catalyst composition.

5. The process as claimed in claim 1, wherein the dispersing the catalyst-ionomer cake in the electrode liquid carrier comprises combining the catalyst-ionomer cake and the electrode liquid carrier; wherein the combining the catalyst-ionomer cake and the electrode liquid carrier further comprises homogenizing the catalyst-ionomer cake and the electrode liquid carrier to produce the electrode layer composition.

6. The process as claimed in claim 1, wherein the catalyst liquid carrier comprises water and one or more $C_1$-$C_4$ alcohols selected from the group consisting of ethanol, 1-propanol, 2-propanol, and combinations thereof; wherein a concentration of the one or more $C_1$-$C_4$ alcohols in the catalyst liquid carrier is less than 75% by weight.

7. The process as claimed in claim 1, wherein the providing the electrode liquid carrier further comprises providing a further ion exchange material; wherein the dispersing the catalyst-ionomer cake in the electrode liquid carrier further comprises combining the catalyst-ionomer cake with the further ion exchange material such that the electrode layer composition comprises the catalyst, the ion exchange material, the further ion exchange material and the electrode liquid carrier, in which at least a portion of the ion exchange material is bound to the catalyst; wherein the further ion exchange material is not bound to the catalyst.

8. The process as claimed in claim 1, wherein the providing the electrode liquid carrier further comprises providing a further catalyst; wherein the dispersing the catalyst-ionomer cake in the electrode liquid carrier further comprises combining the catalyst-ionomer cake with the further catalyst such that the electrode layer composition comprises the catalyst, the further catalyst, the ion exchange material and the electrode liquid carrier, in which at least a portion of the ion exchange material is bound to the catalyst; wherein the ion exchange material is not bound to the further catalyst.

9. The process as claimed in claim 1, wherein the providing the electrode liquid carrier further comprises providing a further liquid carrier; wherein the dispersing the catalyst-ionomer cake in the electrode liquid carrier further comprises combining the catalyst-ionomer cake with the further liquid carrier such that the electrode layer composition comprises the catalyst, the ion exchange material, the electrode liquid carrier and the further liquid carrier, in which at least a portion of the ion exchange material is bound to the catalyst.

10. The process as claimed in claim 1, wherein the catalyst comprises a catalytic component and a catalyst support; wherein the catalyst support is a carbon particulate; wherein the catalytic component comprises one or more of Pt, Ir, Ni, Co, Pd, Ti, Sn, Ta, Nb, Sb, Pb, Mn, Ru and Fe, their oxides, and mixtures thereof; wherein a ratio of the ion exchange material to the catalyst support in the catalyst composition is less than or equal to 1.40.

11. The process as claimed in claim 1, wherein the ion exchange material comprises at least one ionomer comprising a proton conducting polymer; wherein the proton conducting polymer comprises perfluorosulfonic acid.

12. An electrode layer composition obtained by the process of claim 1;
    wherein at least a portion of the ion exchange material is bound to the catalyst; wherein a weight ratio of the ion exchange material bound to the catalyst compared to a total weight of the ion exchange material in the electrode layer composition is at least 0.3.

13. A process for manufacturing a membrane electrode assembly component, said process comprising:
    providing a first electrode layer composition obtained by the process of claim 1, said first electrode layer composition comprising a first catalyst, a first ion exchange material and a first electrode liquid carrier, in which at least a portion of the first ion exchange material is bound to the first catalyst;
    applying the first electrode layer composition to a first side of an electrolyte membrane to provide a layer of the first electrode layer composition on the first side of the electrolyte membrane; and
    heating the layer of the first electrode layer composition on the first side of the electrolyte membrane to remove the electrode liquid carrier from the first electrode layer composition to provide a first electrode on the electrolyte membrane, wherein the first electrode comprises the first catalyst and the first ion exchange material to produce the membrane electrode assembly component comprising the first electrode and the electrolyte membrane.

14. A process for manufacturing a membrane electrode assembly comprising the process of claim 13, and further comprising:
    providing a second electrode layer composition obtained by the process of claim 1, said second electrode layer composition comprising a second catalyst, a second ion exchange material and a second electrode liquid carrier, in which at least a portion of the second ion exchange material is bound to the second catalyst;
    applying the second electrode layer composition to a second side of the electrolyte membrane, the second side opposite to that of the first side of the electrolyte membrane, to provide a layer of the second electrode layer composition on the second side of the electrolyte membrane; and
    heating the layer of the second electrode layer composition on the second side of the electrolyte membrane to remove the electrode liquid carrier from the second electrode layer composition to provide a second electrode on the electrolyte membrane, wherein the second electrode comprises the second catalyst and the second ion exchange material to provide a membrane electrode assembly comprising, in order, the first electrode, the electrolyte membrane, and the second electrode;
    wherein the second electrode layer composition is the same as or different from the first electrode layer composition in terms of one or more of a group selected from the catalyst, the ion exchange material, and the electrode liquid carrier;
    wherein the heating of the layer of the first electrode layer composition and the heating of the layer of the second electrode layer composition occurs simultaneously or sequentially; wherein the first electrode and the second electrode are electronically conductive.

15. The process as claimed in claim 14, wherein the first electrode has a first side and a second side opposite to the first side, the first side of the first electrode in contact with the first side of the electrolyte membrane, and wherein the process further comprises:
    providing a first gas diffusion layer; and
    applying the first gas diffusion layer to the second side of the first electrode to provide a membrane electrode assembly comprising, in order, the first gas diffusion layer, the first electrode, the electrolyte membrane and the second electrode.

16. The process as claimed in claim 15, wherein the second electrode has a first side and a second side opposite to the first side, the first side of the second electrode in contact with the second side of the electrolyte membrane, and wherein the process further comprises:
    providing a second gas diffusion layer; and
    applying the second gas diffusion layer to the second side of the second electrode to provide a membrane electrode assembly comprising, in order, the first gas diffusion layer, the first electrode, the electrolyte membrane, the second electrode and the second gas diffusion layer.

17. The process as claimed in claim 14, wherein the electrolyte membrane comprises an ion exchange material; wherein the ion exchange material of the first electrode and the second electrode has the same composition as the ion exchange material of the electrolyte membrane, or the ion exchange material of the electrolyte membrane has a different composition than the ion exchange material of the first electrode and the second electrode.

18. The process as claimed in claim 17, wherein the electrolyte membrane is a polymer electrolyte membrane comprising the ion exchange material comprising at least one ionomer; wherein the at least one ionomer of the polymer electrolyte membrane has a density not lower than about 1.9 g/cc at 0% relative humidity.

19. The process as claimed in claim 18, wherein the at least one ionomer of the polymer electrolyte membrane comprises a proton conducting polymer comprising perfluorosulfonic acid.

20. The process as claimed in claim 18, wherein the polymer electrolyte membrane is a reinforced polymer electrolyte membrane, and the reinforced polymer electrolyte membrane further comprises a microporous support;

wherein the microporous support comprises at least one fluorinated polymer; wherein the at least one fluorinated polymer is polytetrafluoroethylene (PTFE), poly (ethylene-co- tetrafluoroethylene) (PETFE), expanded polytetrafluoroethylene (ePTFE), polyvinylidene fluoride (PVDF), expanded polyvinylidene fluoride (ePVDF), expanded poly (ethylene-co-tetrafluoroethylene) (ePETFE) or mixtures thereof.

21. The process as claimed in claim 20, wherein the microporous support comprises at least one hydrocarbon polymer.

22. A membrane electrode assembly component obtained by the process according to claim 15; wherein the membrane electrode assembly is a fuel cell membrane electrode assembly.

23. A method for determining a bound ratio of an electrode layer composition, the electrode layer composition comprising an ion exchange material, a catalyst and an electrode liquid carrier, wherein at least a portion of the ion exchange material is bound to the catalyst, wherein the bound ratio is a weight ratio of the ion exchange material bound to the catalyst compared to a total amount of the ion exchange material in the electrode layer composition, the method comprising:

providing the electrode layer composition from a catalyst composition by the process of claim 1;

calculating a weight ratio of the ion exchange material to the catalyst or the catalyst support in the electrode layer composition;

separating the electrode layer composition to provide a liquid layer comprising the electrode liquid carrier and any unbound ion exchange material and a sediment layer comprising the catalyst and any ion exchange material bound to the catalyst;

extracting the liquid layer to provide an isolated sediment layer;

determining a weight ratio of the ion exchange material to the catalyst or the catalyst support in the isolated sediment layer; and calculating the bound ratio by dividing the weight ratio of the ion exchange material to the catalyst or the catalyst support in the isolated sediment layer by the weight ratio of the ion exchange material to the catalyst or the catalyst support in the electrode layer composition;

wherein the separating of the electrode layer composition to provide a liquid layer and a sediment layer comprises centrifuging the electrode layer composition.

24. The method as claimed in claim 23, wherein the extracting the liquid layer comprises extracting the liquid layer by a syringe;

wherein the weight ratio of the ion exchange material to the catalyst or the catalyst support in the electrode layer composition is calculated from a weight amount of the ion exchange material and the catalyst added to the liquid carrier to provide the electrode layer composition;

wherein the determining the weight ratio of the ion exchange material to the catalyst or the catalyst support in the sediment layer is carried out by a thermogravimetric analysis of the sediment layer or a portion thereof.

\* \* \* \* \*